United States Patent
Ahn et al.

(10) Patent No.: US 12,058,315 B2
(45) Date of Patent: Aug. 6, 2024

(54) VIDEO CODING METHOD AND DEVICE, AND RECORDING MEDIUM STORING BITSTREAM

(71) Applicant: INTELLECTUAL DISCOVERY CO., LTD., Seoul (KR)

(72) Inventors: Yong Jo Ahn, Seoul (KR); Jong Seok Lee, Seoul (KR)

(73) Assignee: INTELLECTUAL DISCOVERY CO., LTD., Seoul (KR)

(*) Notice: Subject to any disclaimer, the term of this patent is extended or adjusted under 35 U.S.C. 154(b) by 139 days.

(21) Appl. No.: 17/905,554

(22) PCT Filed: Mar. 4, 2021

(86) PCT No.: PCT/KR2021/002661
§ 371 (c)(1),
(2) Date: Sep. 2, 2022

(87) PCT Pub. No.: WO2021/177735
PCT Pub. Date: Sep. 10, 2021

(65) Prior Publication Data
US 2023/0108639 A1    Apr. 6, 2023

(30) Foreign Application Priority Data

Mar. 4, 2020 (KR) .......... 10-2020-0027325
Mar. 4, 2020 (KR) .......... 10-2020-0027326

(51) Int. Cl.
*H04N 19/132* (2014.01)
*H04N 19/105* (2014.01)
*H04N 19/117* (2014.01)
*H04N 19/176* (2014.01)

(52) U.S. Cl.
CPC ......... *H04N 19/105* (2014.11); *H04N 19/117* (2014.11); *H04N 19/132* (2014.11); *H04N 19/176* (2014.11)

(58) Field of Classification Search
CPC .......................... H04N 19/117; H04N 19/132
USPC .......................... 375/240.02, 240.21, 240.29
See application file for complete search history.

(56) References Cited

U.S. PATENT DOCUMENTS

2013/0188703 A1  7/2013 Liu et al.
2020/0344468 A1* 10/2020 Lin ...................... H04N 19/105

FOREIGN PATENT DOCUMENTS

JP       2007-28034 A       2/2007
KR    10-2015-0052248 A    5/2015
KR    10-2019-0046852 A    5/2019

OTHER PUBLICATIONS

International Search Report for PCT/KR2021/002661 by Korean Intellectual Property Office dated Jun. 25, 2021.
Bross, Benjamin et al. Versatile Video Coding (Draft 7). JVET-P2001-vE. Joint Video Experts Team (JVET) of ITU-T SG 16 WP 3 and ISO/IEC JTC 1/SC 29/WG 11 16th Meeting: Geneva, CH. ph. 1-465, Nov. 14, 2019.

* cited by examiner

*Primary Examiner* — Jeffery A Williams
(74) *Attorney, Agent, or Firm* — BROADVIEW IP LAW, PC

(57) ABSTRACT

An image encoding/decoding method and device according to the present invention may comprise: acquiring information for matrix-based prediction of a current block; and generating a prediction block of the current block on the basis of the information for the matrix-based prediction.

7 Claims, 15 Drawing Sheets

VIDEO CODING METHOD AND DEVICE, AND RECORDING MEDIUM STORING BITSTREAM

CROSS-REFERENCE TO RELATED APPLICATIONS

This application is a National Phase Entry Application of PCT Application No. PCT/KR2021/002661 filed on Mar. 4, 2021, which claims priority to Korean Patent Application No. 10-2020-0027325 filed on Mar. 4, 2020, and Korean Patent Application No. 10-2020-0027326 filed on Mar. 4, 2020, in Korean Intellectual Property Office, the entire contents of which are hereby incorporated by reference in its entirety.

TECHNICAL FIELD

The present disclosure relates to a method and a device for processing a video signal.

BACKGROUND ART

As a market demand for a high-resolution video has increased, a technology which may effectively compress a high resolution image is necessary. According to such a market demand, MPEG (Moving Picture Expert Group) of ISO/IEC and VCEG (Video Coding Expert Group) of ITU-T jointly formed JCT-VC (Joint Collaborative Team on Video Coding) to develop HEVC (High Efficiency Video Coding) video compression standards on January 2013 and has actively conducted research and development for next-generation compression standards.

Video compression is largely composed of intra prediction, inter prediction, transform, quantization, entropy coding, and in-loop filter. Among them, the intra prediction refers to a technique for generating a prediction block for a current block using reconstructed pixels existing around the current block. An encoder encodes an intra prediction mode used for intra prediction, and a decoder reconstructs the encoded intra prediction mode to perform intra prediction.

DISCLOSURE

Technical Problem

A purpose of the present disclosure is to provide a more efficient intra or inter prediction method.

A purpose of the present disclosure is to provide an inter prediction method based on block partitioning having various sizes/shapes.

Technical Solution

An image encoding/decoding method and device according to the present disclosure may generate a prediction block of a current block through matrix-based prediction and determine/encode information for the matrix-based prediction.

An image encoding/decoding method and device according to the present disclosure may obtain information for matrix-based prediction of a current block and generate a prediction block of the current block based on the information for the matrix-based prediction.

In an image encoding/decoding method and device according to the present disclosure, the step of generating the prediction block may comprise determining a reference region for the matrix-based prediction, generating an input vector for the matrix-based prediction by applying a down-sampling filter to the reference region, obtaining a first prediction sample of the current block based on the input vector and a matrix value for the matrix-based prediction, and obtaining a second prediction sample of the current block through interpolation based on at least one of the first prediction sample, a neighboring sample of the current block, or the input vector.

In an image encoding/decoding method and device according to the present disclosure, the reference region may be determined as at least one of a plurality of candidate lines pre-defined in an image decoding apparatus, and the plurality of candidate lines may include at least one of a top sample line, a left sample line, a top-right sample line, or a bottom-left sample line of the current block.

In an image encoding/decoding method and device according to the present disclosure, the reference region may further include a corner sample of the current block.

In an image encoding/decoding method and device according to the present disclosure, a length of the input vector may be variably determined based on a property of the current block, and the property of the current block may include at least one of a size, a shape, a position, or a component type of the current block.

In an image encoding/decoding method and device according to the present disclosure, a number of taps of the downsampling filter may be variably determined based on a length of a reference sample line belonging to the reference region.

In an image encoding/decoding method and device according to the present disclosure, the neighboring sample of the current block may include a first neighboring sample located on the same horizontal line as the second prediction sample and a second neighboring sample located on the same vertical line as the second prediction sample.

In an image encoding/decoding method and device according to the present disclosure a direction of the interpolation may be variably determined based on the property of the current block.

A computer readable recoding medium according to the present disclosure may store bitstream encoded by the image encoding method.

Advantageous Effects

A video signal processing method and apparatus according to the present disclosure can improve prediction accuracy and image coding efficiency through matrix-based prediction.

The video signal processing method and apparatus according to the present disclosure can improve video signal coding efficiency through geometric block partitioning.

The video signal processing method and apparatus according to the present invention can improve video signal coding efficiency through inter prediction based on geometric block partitioning.

BEST MODE FOR DISCLOSURE

Figure 1:
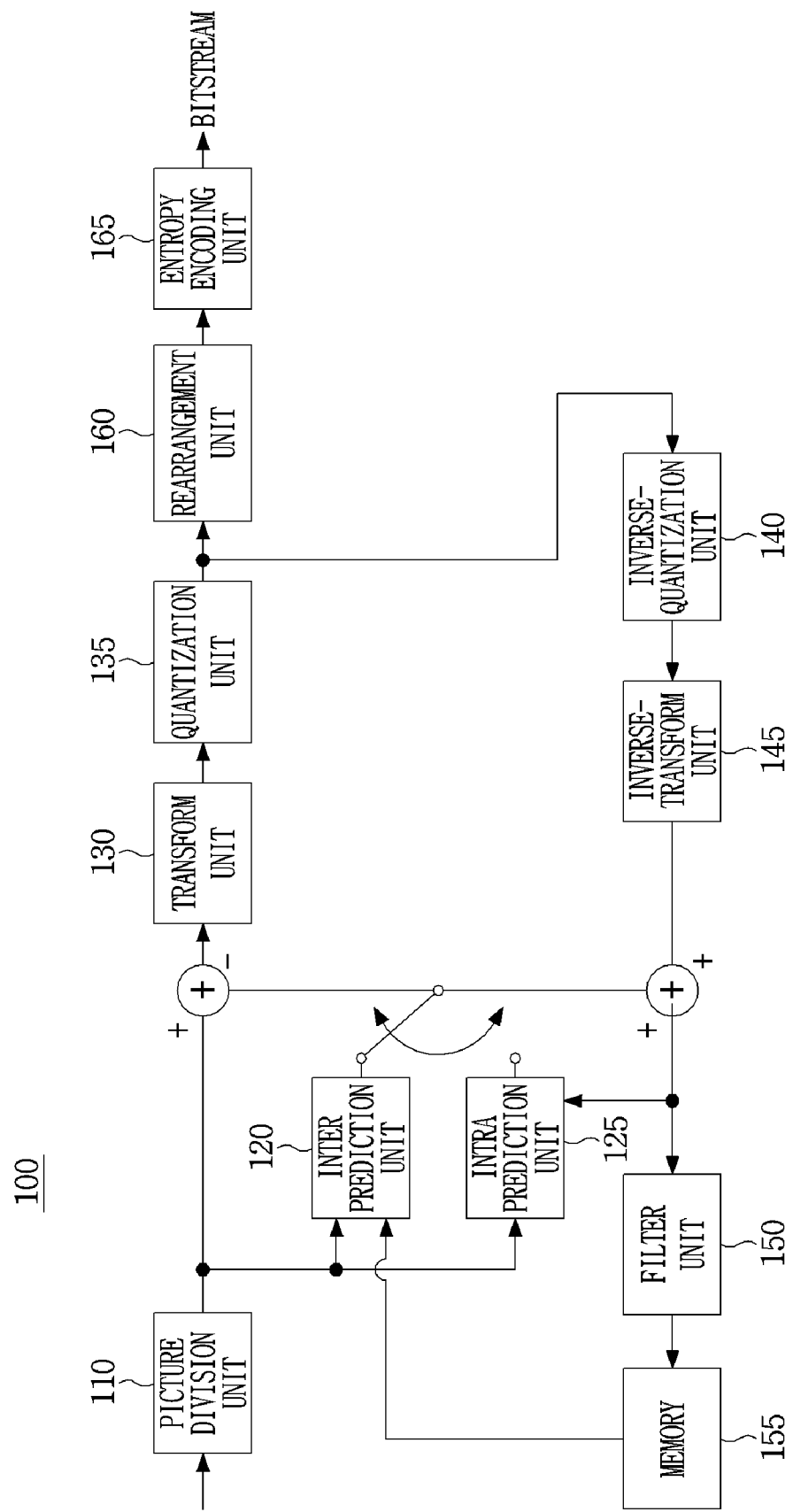
FIG. 1 is a block diagram showing an image encoding device according to the present disclosure.

An image encoding/decoding method and device according to the present disclosure may generate a prediction block of a current block through matrix-based prediction and determine/encode information for the matrix-based prediction.

An image encoding/decoding method and device according to the present disclosure may obtain information for matrix-based prediction of a current block and generate a prediction block of the current block based on the information for the matrix-based prediction.

In an image encoding/decoding method and device according to the present disclosure, the step of generating the prediction block may comprise determining a reference region for the matrix-based prediction, generating an input vector for the matrix-based prediction by applying a downsampling filter to the reference region, obtaining a first prediction sample of the current block based on the input vector and a matrix value for the matrix-based prediction, and obtaining a second prediction sample of the current block through interpolation based on at least one of the first prediction sample, a neighboring sample of the current block, or the input vector.

In an image encoding/decoding method and device according to the present disclosure, the reference region may be determined as at least one of a plurality of candidate lines pre-defined in an image decoding apparatus, and the plurality of candidate lines may include at least one of a top sample line, a left sample line, a top-right sample line, or a bottom-left sample line of the current block.

In an image encoding/decoding method and device according to the present disclosure, the reference region may further include a corner sample of the current block.

In an image encoding/decoding method and device according to the present disclosure, a length of the input vector may be variably determined based on a property of the current block, and the property of the current block may include at least one of a size, a shape, a position, or a component type of the current block.

In an image encoding/decoding method and device according to the present disclosure, a number of taps of the downsampling filter may be variably determined based on a length of a reference sample line belonging to the reference region.

In an image encoding/decoding method and device according to the present disclosure, the neighboring sample of the current block may include a first neighboring sample located on the same horizontal line as the second prediction sample and a second neighboring sample located on the same vertical line as the second prediction sample.

In an image encoding/decoding method and device according to the present disclosure a direction of the interpolation may be variably determined based on the property of the current block.

A computer readable recoding medium according to the present disclosure may store bitstream encoded by the image encoding method.

MODE FOR DISCLOSURE

Referring to a diagram attached in this description, an embodiment of the present disclosure is described in detail so that a person with ordinary skill in the art to which the inventions pertain may easily carry it out. However, the present disclosure may be implemented in a variety of different shapes and is not limited to an embodiment which is described herein. In addition, a part irrelevant to description is omitted and a similar diagram code is attached to a similar part through the description to clearly describe the present disclosure in a diagram.

In this description, when a part is referred to as being 'connected to' other part, it includes a case that it is electrically connected while intervening another element as well as a case that it is directly connected.

In addition, in this description, when a part is referred to as 'including' a component, it means that other components may be additionally included without excluding other components, unless otherwise specified.

In addition, a term such as first, second, etc. may be used to describe various components, but the components should not be limited by the terms. The terms are used only to distinguish one component from other components.

In addition, in an embodiment on a device and a method described in this description, some configurations of the device or some steps of the method may be omitted. In addition, an order of some configurations of the device or some steps of the method may be changed. In addition, another configuration or another step may be inserted in some configurations of the device or some steps of the method.

In addition, some configurations or some steps in a first embodiment of the present disclosure may be added to a second embodiment of the present disclosure or may be replaced with some configurations or some steps in a second embodiment.

In addition, as construction units shown in an embodiment of the present disclosure are independently shown to represent different characteristic functions, it does not mean that each construction unit is configured in a separate hardware or one software construction unit. In other words, each construction unit may be described by being enumerated as each construction unit for convenience of description, at least two construction units among each construction unit may be combined to configure one construction unit, or one construction unit may be divided into a plurality of construction units to perform a function. Such an integrated embodiment and separated embodiment in each construction unit are also included in a scope of a right on the present disclosure as long as they are not beyond the essence of the present disclosure.

In this description, a block may be variously represented as a unit, a region, a unit, a partition, etc., and a sample may be variously represented as a pixel, a pa, a pixel, etc.

Hereinafter, referring to the attached diagrams, an embodiment of the present disclosure will be described in more detail. In describing the present disclosure, overlapping description for the same component is omitted.

FIG. 1 is a block diagram showing an image encoding device according to the present disclosure.

In reference to FIG. 1, an image encoding device 100 may include a picture partition unit 110, a prediction unit 120, 125, a transform unit 130, a quantization unit 135, a rearrangement unit 160, an entropy encoding unit 165, a dequantization unit 140, an inverse transform unit 145, a filter unit 150 and a memory 155.

A picture partition unit 110 may partition an input picture into at least one processing unit. In this case, a processing unit may be a prediction unit (PU), a transform unit (TU) or a coding unit (CU). Hereinafter, in an embodiment of the present disclosure, a coding unit may be used as a unit performing encoding and may be used as a unit performing decoding.

A prediction unit may be partitioned in at least one square shape or rectangular shape, etc. with the same size within one coding unit and may be partitioned so that any one prediction unit among prediction units partitioned in one coding unit will have a shape and/or size different from another prediction unit. When it is not a minimum coding unit in generating a prediction unit which performs intra prediction based on a coding unit, intra prediction may be performed without being partitioned into a plurality of prediction units, N×N.

A prediction unit 120 and 125 may include an inter prediction unit 120 performing inter prediction and an intra prediction unit 125 performing intra prediction. Whether to perform inter prediction or intra prediction for a prediction unit may be determined, and concrete information according to each prediction method (e.g., an intra prediction mode, a motion vector, a reference picture, etc.) may be determined. A residual value (a residual block) between a generated prediction block and an original block may be input into a transform unit 130. In addition, prediction mode information, motion vector information, etc. used for prediction may be encoded in an entropy encoding unit 165 with a residual value and transmitted to a decoder.

An inter prediction unit 120 may predict a prediction unit based on information of at least one picture of a previous picture or a subsequent picture of a current picture and may predict a prediction unit based on information of some regions which have been encoded in a current picture in some cases. An inter prediction unit 120 may include a reference picture interpolation unit, a motion prediction unit and a motion compensation unit.

In a reference picture interpolation unit, reference picture information may be provided from a memory 155, and pixel information of an integer pixel or less may be generated in a reference picture. For a luma pixel, a DCT-based 8-tap interpolation filter with different filter coefficients may be used to generate pixel information of an integer pixel or less in a ¼ pixel unit. For a chroma signal, a DCT-based 4-tap interpolation filter with different filter coefficients may be used to generate pixel information of an integer pixel or less in a ⅛ pixel unit.

A motion prediction unit may perform motion prediction based on a reference picture interpolated by a reference picture interpolation unit. As a method for calculating a motion vector, various methods such as FBMA (Full search-based Block Matching Algorithm), TSS (Three Step Search), NTS(New Three-Step Search Algorithm), etc. may be used. A motion vector may have a motion vector value in a ½ or ¼ pixel unit based on an interpolated pixel. In a motion prediction unit, a current prediction unit may be predicted by making a motion prediction method different. For a motion prediction method, various methods such as a skip mode, a merge mode, a AMVP (Advanced Motion Vector Prediction) mode, an intra block copy mode, an affine mode, etc. may be used.

An intra prediction unit 125 may generate a prediction unit based on information of reference pixel around a current block, pixel information in a current picture. When a reference pixel is a pixel which performed inter prediction because a neighboring block in a current prediction unit is a block which performed inter prediction, a reference pixel included in a block which performed inter prediction may be used by being substituted with information of reference pixel of a neighboring block which performed intra prediction. In other words, when a reference pixel is unavailable, information of the unavailable reference pixel may be used by being substituted with at least one reference pixel of available reference pixels.

In addition, a residual block including residual value information, a difference value between a prediction unit which performed prediction based on a prediction unit generated in a prediction unit 120 and 125 and an original block in a prediction unit, may be generated. A generated residual block may be input into a transform unit 130.

In a transform unit 130, an original block and a residual block including residual value information in a prediction unit generated in a prediction unit 120 and 125 may be transformed by using a transform method such as DCT (Discrete Cosine Transform), DST (Discrete Sine Transform), and KLT. Whether to apply DCT, DST or KLT to transform a residual block may be determined based on intra prediction mode information in a prediction unit used to generate a residual block.

A quantization unit 135 may quantize values which are transformed into a frequency domain in a transform unit 130. According to a block or according to image importance, a quantized coefficient may be changed. Values calculated in a quantization unit 135 may be provided to a dequantization unit 140 and a rearrangement unit 160.

A rearrangement unit 160 may perform rearrangement of coefficient values for quantized residual values.

A rearrangement unit 160 may change two-dimensional block-shaped coefficients into a one-dimensional vector shape through a coefficient scanning method. For example, in a rearrangement unit 160, a DC coefficient to coefficients in a high frequency domain may be scanned by a zig-zag scanning method and may be changed into a one-dimensional vector shape. A vertical scan which scans two-dimensional block-shaped coefficients in a column direction or a horizontal scan which scans two-dimensional block-shaped coefficients in a row direction may be used instead of a zig-zag scan according to a size of a transform unit and an intra prediction mode. In other words, whether which scanning method among a zig-zag scan, a vertical directional scan and a horizontal directional scan will be used may be determined according to a size of a transform unit and an intra prediction mode.

An entropy encoding unit 165 may perform entropy encoding based on values calculated by a rearrangement unit 160. For example, entropy encoding may use various encoding methods such as Exponential Golomb, CAVLC(Context-Adaptive Variable Length Coding), and CABAC(Context-Adaptive Binary Arithmetic Coding). Regarding it, an entropy encoding unit 165 may encode residual value coefficient information in a coding unit from a rearrangement unit 160 and a prediction unit 120, 125. In addition, according to the present disclosure, it is possible to signal and transmit information indicating that motion information is derived and used at a decoder side and information on a method used for deriving motion information.

In a dequantization unit 140 and an inverse transform unit 145, values quantized in a quantization unit 135 are dequantized and values transformed in a transform unit 130 are inversely transformed. Residual values generated in a dequantization unit 140 and an inverse transform unit 145 may generate a reconstructed block by being combined with a prediction unit which is predicted through a motion prediction unit, a motion compensation unit and an intra prediction unit included in a prediction unit 120 and 125.

A filter unit 150 may include at least one of a deblocking filter, an offset modification unit and ALF (Adaptive Loop Filter). A deblocking filter may remove block distortion generated by a boundary between blocks in a reconstructed picture. An offset modification unit may modify an offset with an original image in a pixel unit for an image performing deblocking. A method in which a pixel included in an image is divided into the certain number of regions, a region which will perform an offset is determined and an offset is applied to a corresponding region, or a method in which an offset is applied by considering edge information of each pixel may be used to perform offset modification for a specific picture. ALF (Adaptive Loop Filtering) may be performed based on a value comparing a filtered reconstructed image with an original image. A pixel included in an image may be divided into a predetermined group, one filter which will be applied to a corresponding group may be determined, and filtering may be performed discriminately per group.

A memory 155 may store a reconstructed block or picture calculated in a filter unit 150, and a stored reconstructed block or picture may be provided for a prediction unit 120 and 125 when inter prediction is performed.

Figure 2:
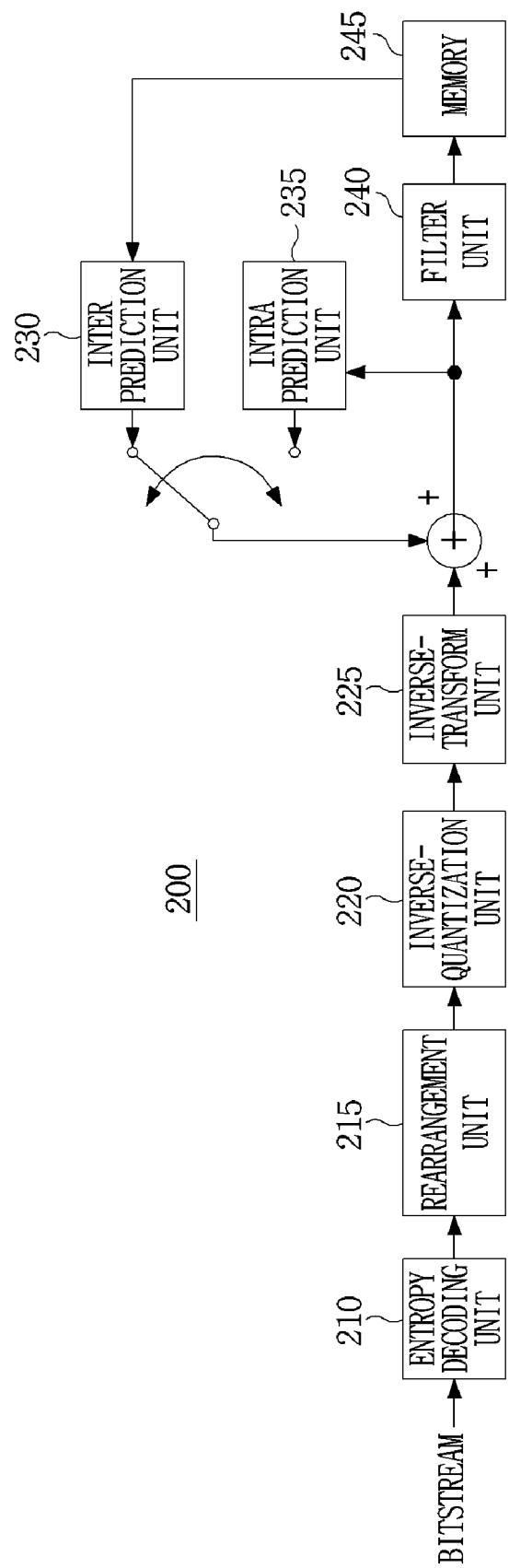
FIG. 2 is a block diagram showing an image decoding device according to the present disclosure.

FIG. 2 is a block diagram showing an image decoding device according to the present disclosure.

In reference to FIG. 2, an image decoding device 200 may include an entropy decoding unit 210, a rearrangement unit 215, a dequantization unit 220, an inverse transform unit 225, a prediction unit 230 and 235, a filter unit 240 and a memory 245.

When an image bitstream is input in an image encoding device, the input bitstream may be decoded in a process opposite to that of the image encoding device.

An entropy decoding unit 210 may perform entropy decoding in a process opposite to a process in which entropy encoding is performed in an entropy encoding unit of an image encoder. For example, corresponding to a method performed in an image encoder, various methods such as Exponential Golomb, CAVLC(Context-Adaptive Variable Length Coding) and CABAC(Context-Adaptive Binary Arithmetic Coding) may be applied.

In an entropy decoding unit 210, information related to intra prediction and inter prediction performed in an encoder may be decoded.

A rearrangement unit 215 may perform rearrangement for a bitstream entropy-decoded in an entropy decoding unit 210 based on a rearrangement method of an encoding unit. Coefficients represented in a one-dimensional vector shape may be reconstructed into coefficients in a two-dimensional block shape and rearranged.

A dequantization unit 220 may perform dequantization based on a quantization parameter provided in an encoder and coefficient values of a rearranged block.

An inverse transform unit 225 may perform inverse DCT, inverse DST and inverse KLT, i.e., inverse transform for DCT, DST and KLT, i.e., transform performed in a transform unit for a result of quantization performed in an image encoder. Inverse transform may be performed based on a transmission unit determined in an image encoder. In the inverse transform unit 225 of an image decoder, a transform method (e.g., DCT, DST, KLT) may be selectively performed according to a plurality of information such as a prediction method, a size of a current block, a prediction direction, etc.

A prediction unit 230 and 235 may generate a prediction block based on information related to prediction block generation provided in an entropy decoding unit 210 and pre-decoded block or picture information provided in a memory 245.

As described above, when a size of a prediction unit is the same as that of a transform unit in performing intra prediction in the same manner as an operation in an image encoder, intra prediction for a prediction unit may be performed based on a pixel at a left position, a pixel at a top-left position and a pixel at a top position of a prediction unit, but when a size of a prediction unit is different from that of a transform unit in performing intra prediction, intra prediction may be performed by using a reference pixel based on a transform unit. In addition, intra prediction using N×N partitions only for a minimum coding unit may be used.

A prediction unit 230 and 235 may include a prediction unit determination unit, an inter prediction unit and an intra prediction unit. A prediction unit determination unit may receive a variety of information such as prediction unit information, prediction mode information of an intra prediction method, information related to motion prediction of an inter prediction method, etc. which are input from an entropy decoding unit 210, classify a prediction unit in a current coding unit and determine whether a prediction unit performs inter prediction or intra prediction. On the other hand, if information indicating that motion information is derived and used at a decoder side and information on a method used for deriving motion information are transmitted from an encoder 100 without transmitting motion prediction-related information for the inter prediction, the prediction unit determination unit determines whether an inter prediction unit 230 performs prediction based on information transmitted from an encoder 100.

An inter prediction unit 230 may perform inter prediction on a current prediction unit based on information included in at least one picture of a previous picture or a subsequent picture of a current picture including a current prediction unit by using information necessary for inter prediction of a current prediction unit provided by an image encoder. To perform inter prediction, whether a motion prediction method in a prediction unit included in a corresponding coding unit based on a coding unit is a skip mode, a merge mode, a AMVP mode, an intra block copy mode, or an affine mode may be determined.

An intra prediction unit 235 may generate a prediction block based on pixel information in a current picture. When a prediction unit is a prediction unit which performs intra prediction, intra prediction may be performed based on intra prediction mode information in a prediction unit provided by an image encoder.

An intra prediction unit 235 may include an adaptive intra smoothing (AIS) filter, a reference pixel interpolation unit and a DC filter. As a part performing filtering for a reference pixel of a current block, an AIS filter may be applied by determining whether a filter is applied according to a prediction mode of a current prediction unit. AIS filtering may be performed for a reference pixel of a current block by using a prediction mode of a prediction unit and AIS filter information provided by an image encoder. When a prediction mode of a current block is a mode where AIS filtering is not performed, an AIS filter may not be applied.

When a prediction mode of a prediction unit is a prediction unit in which intra prediction is performed based on a pixel value interpolating a reference pixel, a reference pixel interpolation unit may interpolate a reference pixel to generate a reference pixel in a pixel unit which is equal to or smaller than an integer value. When a prediction mode of a current prediction unit is a prediction mode which generates a prediction block without interpolating a reference pixel, a reference pixel may not be interpolated. A DC filter may generate a prediction block through filtering when a prediction mode of a current block is a DC mode.

A reconstructed block or picture may be provided to a filter unit 240. A filter unit 240 may include a deblocking filter, an offset modification unit and an ALF.

Information on whether a deblocking filter is applied to a corresponding block or picture and information on whether a strong filter or a weak filter is applied when a deblocking filter is applied may be provided by an image encoding device. A deblocking filter of an image decoder may receive information related to a deblocking filter provided by an image encoder and perform deblocking filtering for a corresponding block in an image decoder.

An offset modification unit may perform offset modification on a reconstructed image based on a type of offset modification, offset value information, etc. applied to an image in encoding. An ALF may be applied to a coding unit based on information on whether an ALF is applied, ALF coefficient information, etc. provided by an encoder. Such ALF information may be provided by being included in a specific parameter set.

A memory 245 may store a reconstructed picture or block for use as a reference picture or a reference block and also provide a reconstructed picture to an output unit.

The present disclosure relates to a method and apparatus for using intra prediction or inter prediction among video coding techniques. More particularly, it relates to a method and apparatus for adaptively sampling various elements reference samples and prediction samples in applying matrix-based intra prediction among intra prediction techniques. Also, in this specification, terms such as a reference sample, a reference sample line, and a reference region may be interpreted as having equivalent meanings, and the reference sample may refer to any one sample belonging to the sample line or the reference region. In addition, a reference sample, a reference sample line, and a reference region in the present specification may mean sample(s) spatially adjacent to the current block or sample(s) temporally adjacent to the current block. Alternatively, the reference sample, the reference sample line, and some samples in the reference region may be sample(s) spatially adjacent to the current block, and the remaining samples may be sample(s) temporally adjacent to the current block. Here, the temporally adjacent sample(s) may mean at least one sample belonging to a picture temporally different from the current block, but belonging to a block at the same position as the current block, or may mean at least one sample belonging to a block of a location shifted by a predetermined offset from the current block. Alternatively, temporally adjacent sample(s) may refer to at least one sample belonging to a neighboring block adjacent to a block at the same position or a block at a shifted position as described above. In addition, the present disclosure may be equally/similarly applied to matrix-based inter prediction, and a redundant description will be omitted below. Hereinafter, matrix-based intra prediction may be understood as being replaced with matrix-based inter prediction.

The present disclosure relates to a method and an apparatus for adaptively sampling a reference sample and a prediction sample. A method and an apparatus of downsampling for reducing an interference phenomenon that occurs when a reference sample is generated are proposed, and a method and an apparatus for improving prediction performance by using more appropriate samples when upsampling for generation of prediction sample after a matrix is multiplied.

In this case, by applying the sampling method proposed in the present disclosure, it is intended to improve video compression efficiency by improving intra prediction performance.

Figure 3:
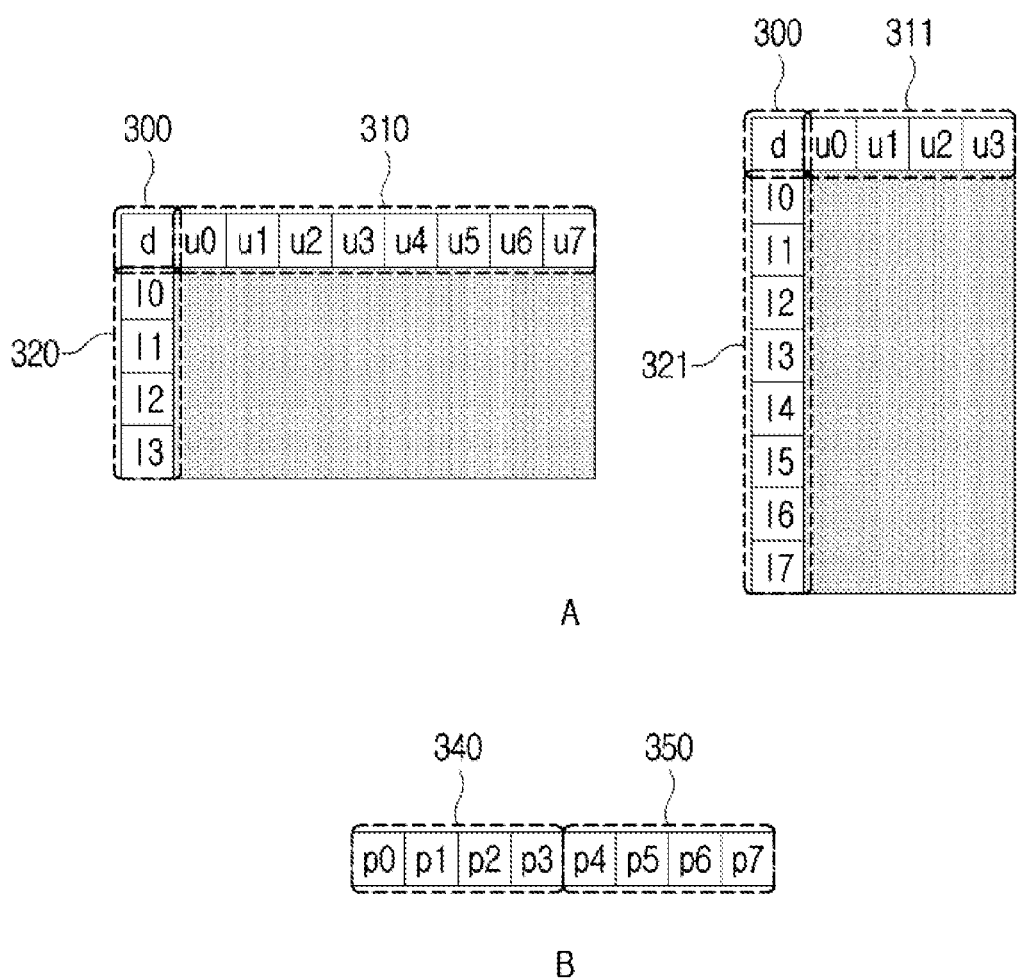
FIG. 3 is a diagram illustrating an input vector of matrix-based intra prediction and a downsample target sample for generating the input vector.

FIG. 3 is a diagram illustrating an input vector of matrix-based intra prediction and a downsample target sample for generating the input vector.

FIG. 3A is a diagram showing samples to be downsampling for generating a prediction vector and an input vector of matrix-based intra prediction generated from a downsampling process when matrix-based intra prediction is performed on a current block 330.

A downsampling target may be classified into a top sample horizontal line 310 having the same width as the current block, a top-left corner sample 300 of the current block, and a left sample vertical line 320 of the current block. In addition, downsampling may be performed on a reference sample line such as the top 311 and left sample lines 321 of the current block according to various current blocks. The reference sample line for downsampling may include at least one of a plurality of candidate lines. Here, one of the plurality of candidate lines may be a sample line located at the top of the current block (hereinafter referred to as a top sample line), and the other one may be a sample line located at the left side of the current block (hereinafter referred to as a left sample line). Also, the plurality of candidate lines may further include at least one of a sample line located at the right side of the current block and a sample line located at a bottom side of the current block.

The aforementioned reference sample line may further include one or more top-right sample lines adjacent to the current block, and may further include one or more bottom-left sample lines adjacent to the current block. The top-right sample line may be positioned at the same horizontal line as the top sample lines 310 and 311 and may be configured with one or more samples positioned at the top-right of the current block. Similarly, the bottom-left sample line may be positioned on at the same vertical line as the left sample lines 320 and 321 and may be configured with one or more samples positioned at the bottom-left of the current block. At least one of the plurality of candidate lines described above may be selectively used. For example, one of the top sample line or the left sample line may be selectively used. Alternatively, the top-right sample line may be used only when the top sample line is available, and the bottom left sample line may be used only when the left sample line is available.

The selection may be performed based on an index specifying a position of a sample line which is the downsampling target. For example, when the index is a first value, the top/left sample line may be used, when the index is a second value, only the top sample line may be used, and when the index is a third value, only the left sample line may be used.

Alternatively, a position of the sample line to be downsampling may be determined differently according to a property of the block. Here, the block may mean a current block or a spatial/temporal neighboring block. The property may mean a block size/shape, a block position, a component type (e.g., a luma component, a chroma component), an intra prediction mode, the number of intra prediction modes, an angle, or a directionality, etc. The block position may mean at least one of whether a boundary of a block is positioned at a CTU boundary, whether the boundary of the block is positioned at a tile boundary, whether the boundary of the block is positioned at a slice boundary, or whether the boundary of the block is positioned at a subpicture boundary. The boundary of the block may be positioned on at least one of top, bottom, left, or right.

For example, in the case of the current block being a square type, both the top and left sample lines are used, and in the case of the current block being a rectangle type, either the top or the left sample line may be selectively used. When the width of the current block is greater than the height, the top sample line may be used, and when the width of the current block is smaller than the height, the left sample line may be used. When a top boundary of the current block is located at a boundary of a tile, slice, or subpicture, the top sample line may not be used and the left sample line may be used.

In this case, downsampling may be performed on all of the reference sample lines or may be selectively performed on some of the reference sample lines. The reference sample line is not limited to one top/left sample line adjacent to the current block, as shown in FIG. 3, and two, three or more consecutive top/left sample lines may be used. Downsampling may be performed on a sample line that is not adjacent to the current block. For example, it is assumed that the top block of the current block includes 4 sample lines. In this case, based on the top boundary of the current block, only odd-numbered sample lines may be used or only even-numbered sample lines may be used. Alternatively, only the first sample line and the third sample line (or the fourth sample line) may be used. Alternatively, only one of the four sample lines may be selectively used. Here, the selection may be performed based on an index specifying the position of the reference sample line, or may be performed in consideration of the above-described properties of the block.

The number of downsampling target sample lines (i.e., top sample lines) in the top neighboring block of the current block may be m, and the number of downsampling target sample lines (i.e., left sample lines) in the left neighboring block may be n. Here, m and n may be set identically to each other regardless of the above-described block properties, or may be set differently depending on the above-described block properties.

FIG. 3A is a diagram for comparing the sizes of the current block 330 and the reference sample line by simultaneously illustrating the left sample vertical line, the top sample horizontal line, and the corner sample with respect to the current block.

FIG. 3B is a diagram illustrating an input vector of matrix-based intra prediction generated by downsampling, and the input vector may be classified into a front part 340 and a rear part 350.

As an embodiment, a value downsampled from the top sample horizontal line 310 and/or the left sample vertical line 320 of the current block may be stored in the front part 340 and the rear part 350 of the input vector. In this case, a storing order may be determined through a flag such as intra_mip_transposed. When intra_mip_transposed is a first value (e.g., 0), a value generated from the left sample vertical line may be stored in the front part, and the value generated from the top sample horizontal line may be stored in the back part. In addition, when intra_mip_transposed is a second value (e.g., 1), the reverse operation may be performed. In the present disclosure, the number of samples belonging to the reference sample line and the number of samples belonging to the input vector are 1:1 or 2:1, but are not limited thereto, and downsampling may be performed in a ratio being 4:1, 8:1, 16:1, etc. Here, the downsampling ratio may be variably determined according to the above-described properties of the block, or information indicating the downsampling ratio may be separately encoded and signaled. The information indicating the downsampling ratio may specify any one of a plurality of candidate ratios pre-defined in the image encoding/decoding apparatus. The plurality of candidate ratios may include at least two of 1:1, 2:1, 4:1, 8:1, or 16:1. The information may be signaled only when the size of the current block is equal to or greater than a predetermined threshold size. The threshold size may be 16, 32, 64, or 128. When the size of the current block is smaller than the predetermined threshold size, the information indicating the downsampling ratio may be set to a default value (e.g., 2:1 or 4:1) pre-promised to the image encoding/decoding apparatus. Meanwhile, the front part 340 of the input vector and the rear part 350 of the input vector are not limited to having the same length, and may have different lengths. However, the length of the front part and/or the rear part of the input vector belongs to a range of a minimum length and a maximum length pre-promised to the image encoding/decoding device, for example, the minimum length may be 1 or 2, and the maximum length may be 8, 16, 32, or 64.

As another embodiment, a value downsampled from the top sample horizontal line 310 and the corner sample 300 and/or the left sample vertical line 320 of the current block and the corner sample 300 may be stored In the front part 340 of the input vector and the rear part 350 of the input vector. In this case, the storing order may be determined through a flag such as intra_mip_transposed. When intra_mip_transposed is a first value (e.g., 0), values generated from the left sample vertical line and the corner sample may be stored in the front part, and values generated from the top sample horizontal line and the corner sample may be stored in the back part. In addition, when intra_mip_transposed is a second value (e.g., 1), the reverse operation may be performed.

As another embodiment, the front part 340 of the input vector and the rear part 350 of the input vector may be downsampled from one of the top sample horizontal lines 310, 311 or the left sample vertical lines 320, 321. Whether to refer to the top or the left may be determined by a flag. Here, the flag may be determined according to a shape based on horizontal and vertical lengths of a block. As an example, when a ratio of the horizontal length divided by the vertical length is equal to or greater than a predetermined threshold ratio, only the top reference sample of the current block may be used. Here, the threshold ratio ($ratio_{th}$) may be 2, 4, 8 or more. In this case, when the horizontal length is less than or equal to a predetermined threshold value, it may be directly used as an input vector for matrix-based intra prediction without performing downsampling. Here, the threshold may be 4, 8, 16 or more.

The length of the input vector of matrix-based intra prediction may be determined based on a property of the block. As an example, if the shape of the block is 4×4, the length of the input vector is determined to be 4, and in other cases, the length is determined to be 8. The minimum length of the input vector is not limited to 4, and may be an integer less than 4. The maximum length of the input vector is not limited to 8, and may be an integer greater than 8. Each of the minimum/maximum lengths of the input vectors may be a fixed value pre-promised to the encoding/decoding apparatus, or may be variably determined according to the aforementioned properties of the block.

As an embodiment, the number of taps of the downsampling filter may be determined according to the length of the reference sample line. The number of down-sampling filter taps may be a value obtained by dividing the reference sample length by (input vector length/2). Alternatively, the number of downsampling filter taps may be a value obtained by dividing the reference sample length by the input vector length. This case may be a case in which only one of the top or left reference sample lines is referenced.

As another embodiment, when the shape of the block is not 4×4 and the reference sample length is greater than 4, the number of taps of downsampling filter may be a value obtained by dividing the reference sample length by (input vector length/2) and plus n. Here, n is a value greater than or equal to 0, and may be used as the same value by an agreement between the encoder and the decoder. On the contrary, when the shape of the block is not 4×4 and the reference sample length is less than or equal to 4, downsampling may be omitted. For example, since the first block of FIG. 3A has an 8×4 shape, the length of the matrix-based intra prediction input vector may be determined to be 8. In addition, since the length of the left vertical sample line is 4, downsampling may be omitted, and since the length of the top horizontal sample line is 8, when the value of n is 1, the number of taps of the downsampling filter may be determined to be 3. In this case, when intra_mip_transposed is 0, the value of the front part of the input vector may be equal to Equation 1. And the rear part of the input vector may be calculated as in Equation 2. Here, downsampling filter coefficients w0, w1, and w2 may be 1, 1, and 2, respectively.

Alternatively, the sum of the filter coefficients is a power of two, and the filter coefficients may be a combination of various numbers.

$$p0=l0, p1=l1, p2=l2, p3=l3 \qquad \text{[Equation 1]}$$

$$p4=d*w0+u0*w1+u1*w2$$

$$p5=u1*w0+u2*w1+u3*w2$$

$$p6=u3*w0+u4*w1+u5*w2$$

$$p7=u5*w0+u6*w1+u7*w2 \qquad \text{[Equation 2]}$$

As another embodiment, the input vector may be generated through sampling without filtering. In this case, the sampled sample position may use the same position according to a promise between the encoder and the decoder. Also, the number of samples to be sampled may be the same as the input vector to be generated.

Figure 4:
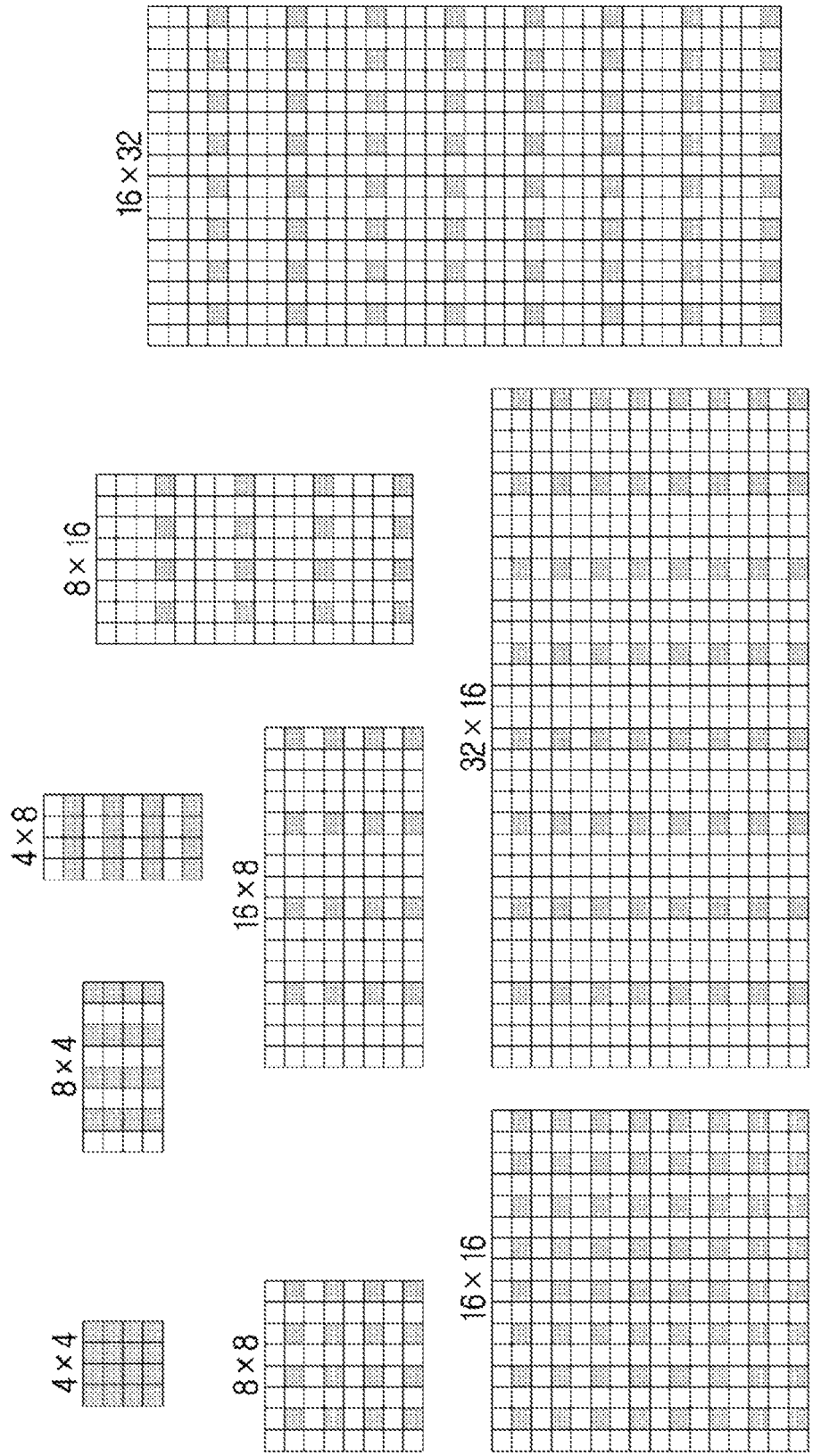
FIG. 4 is a diagram illustrating positions of output samples within a block with respect to an output vector generated after a matrix multiplication process in a matrix-based intra prediction method.

FIG. 4 is a diagram illustrating positions of output samples within a block with respect to an output vector generated after a matrix multiplication process in a matrix-based intra prediction method.

FIG. 4 shows positions of output vector samples of matrix-based intra-picture prediction according to various block sizes within a block, and shows in order or emphasize that an order of the interpolation direction should be considered according to the block size and/or shape in the interpolation step, which is a later step.

In FIG. 4, since when a width of the block is smaller than the height of the block, such as 8×16 or 16×32, an effect of a left reference sample is greater, so it is better way to perform vertical interpolation first and then perform horizontal interpolation for using more left reference samples. Therefore, in the present disclosure, the interpolation direction is determined according to the shape of the block.

In FIG. 4, a gray sample means a prediction sample generated by matrix multiplication, and a white sample is a sample to be generated in a subsequent interpolation step. Matrix-based intra prediction does not predict the entire prediction block, but predicts only sampled positions like large blocks shown in FIG. 4 through a matrix multiplication process in order to reduce computational complexity in the matrix multiplication process. That is, an interpolation step is essentially required after the matrix multiplication step. The predicted positions, the number of predictions, etc. are determined according to the properties of the block mentioned in FIG. 3. In this case, a table pre-defined in the encoding/decoding apparatus may be used.

Figure 5:
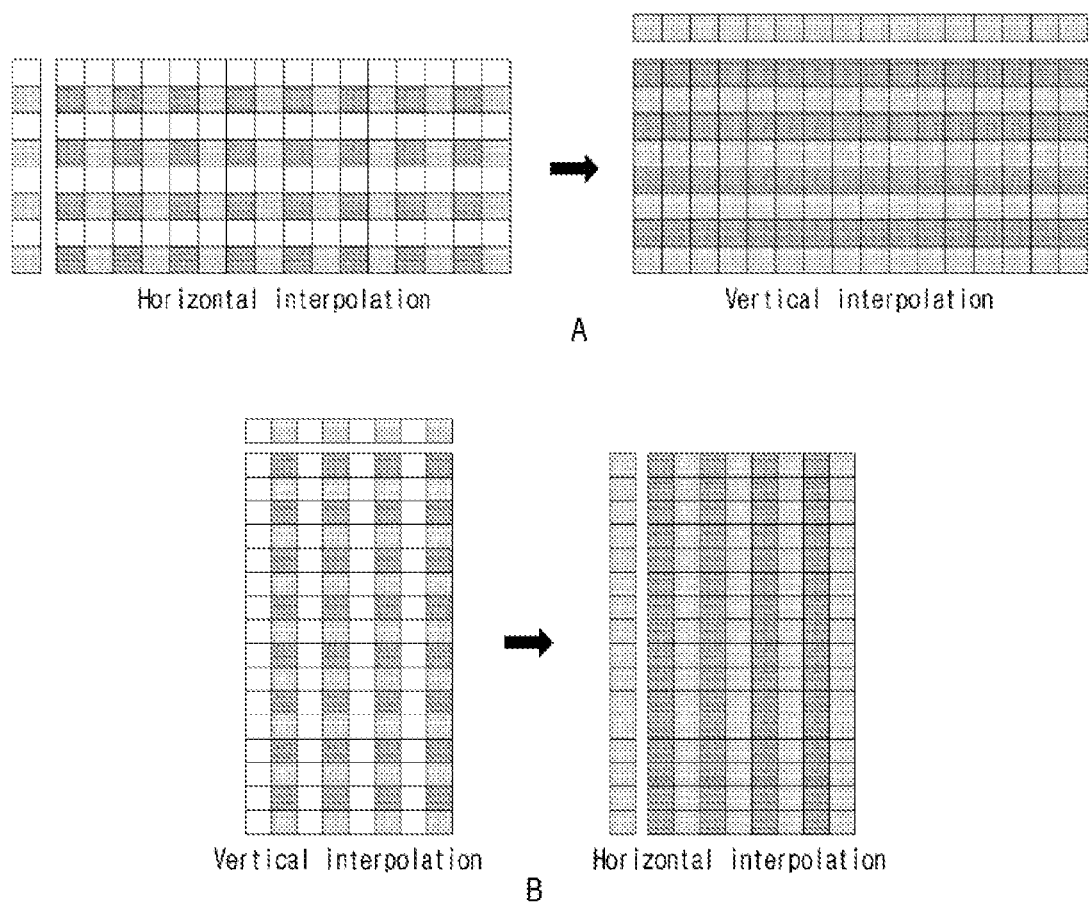
FIG. 5 is a diagram illustrating prediction sample interpolation step in matrix-based intra prediction.

FIG. 5 is a diagram illustrating prediction sample interpolation step in matrix-based intra prediction.

FIG. 5 is a diagram illustrating prediction sample interpolation step in matrix-based intra prediction, and is a diagram for explaining an interpolation method in the interpolation step and an order for an interpolation direction according to a shape of a block.

The interpolation step may include a horizontal interpolation step and a vertical interpolation step. Alternatively, only the interpolation step in one of the horizontal direction and the vertical direction may be included.

In matrix-based intra prediction, the interpolation step is performed using at least one of an already generated prediction sample or a reference sample around the current block. At least one of a prediction sample generated by matrix multiplication, a prediction sample generated through interpolation, or a reference sample around the current block may be selectively used according to the position of the interpolated prediction sample. Here, the neighboring reference sample used for interpolation may be a sample of the left sample line. Alternatively, it may be a sample sampled from the left sample line. Alternatively, it may be an input vector of a matrix product. Alternatively, it may be at least one sample obtained by sampling a part from the input vector of the matrix product. The neighboring reference sample used for interpolation may be a sample of the top sample line. Alternatively, it may be a sample sampled from the top sample line. Alternatively, it may be an input vector of a matrix product. Alternatively, it may be at least one sample obtained by sampling a part from the input vector of the matrix product. Or it may be a sample calculated or derived from a reference sample line generated for other intra prediction. In this case, when the left sample cannot be used, the nearest value among the prediction samples may be used. A sample used for horizontal interpolation of the current block may be one or a plurality of samples usable in a horizontal direction, and in case of vertical interpolation, one or a plurality of samples usable in a vertical direction may be used.

Alternatively, two samples closest to each other in a direction from a sample to be interpolated may be used. For example, in horizontal interpolation, linear interpolation according to a distance may be performed using two samples that are closest to each other in the horizontal direction, and, in vertical interpolation, linear interpolation may be performed using two samples most adjacent in a vertical direction. The two samples may include a neighboring reference sample and a neighboring prediction sample positioned at the same vertical and/or horizontal line as a sample to be interpolated. Here, the prediction sample may include at least one of a prediction sample generated by matrix multiplication or a prediction sample generated through interpolation. However, the present disclosure is not limited thereto, and three or more samples may be used for interpolation. In this case, the three or more samples may include one or more neighboring reference samples and one or more prediction samples. In addition, all of the neighboring reference samples may be located on the same vertical or horizontal line as the sample to be interpolated, and any one of the neighboring reference samples may be located on the same vertical line as the sample to be interpolated, and any other may be located on the same horizontal line as the sample to be interpolated.

Alternatively, a plurality of samples may be used for interpolation. When using the plurality of samples, non-linear interpolation may be performed instead of linear interpolation, and one or a plurality of filters may be used for interpolation. A filter used for interpolation may be different depending on a prediction sample position. In this case, each filter coefficient may be determined from a table according to the sample position. Alternatively, filter coefficients transmitted from a higher level such as APS may be used.

As an embodiment, horizontal interpolation may be performed first, and then vertical interpolation may be performed. In this case, since horizontal interpolation cannot be performed on all rows in the horizontal interpolation step, horizontal interpolation is performed only on the rows in which the reference sample and the prediction sample exist, and then vertical interpolation is performed on all columns as shown in FIG. 5A. Alternatively, on the contrary, vertical interpolation may be performed first and then vertical interpolation may be performed. Such an order of interpolation direction may be a fixed order pre-promised to the image encoding/decoding apparatus.

As another embodiment, the order of the interpolation direction may be determined according to the above-described properties of the block, and then the interpolation step may be performed according to the determined order.

For example, in order to determine the order of the interpolation direction, the horizontal length of the current block and the vertical length of the block may be used. When the horizontal length of the block is greater than the vertical length, vertical interpolation may be performed after horizontal interpolation. On the contrary, when the horizontal length of the block is smaller than the vertical length, vertical interpolation may be performed and then horizontal interpolation may be performed.

Alternatively, the order of the interpolation direction may be determined through a flag transmitted from a specific coding unit. As an example, if a value of the received flag is a first value, horizontal interpolation is performed, and then vertical interpolation is performed. On the contrary, if the value of the flag to be transmitted is a second value, vertical interpolation may be performed, and then horizontal interpolation may be performed. Alternatively, the flag may be determined to be 0 or 1 according to the above-described properties of the block.

Figure 6:
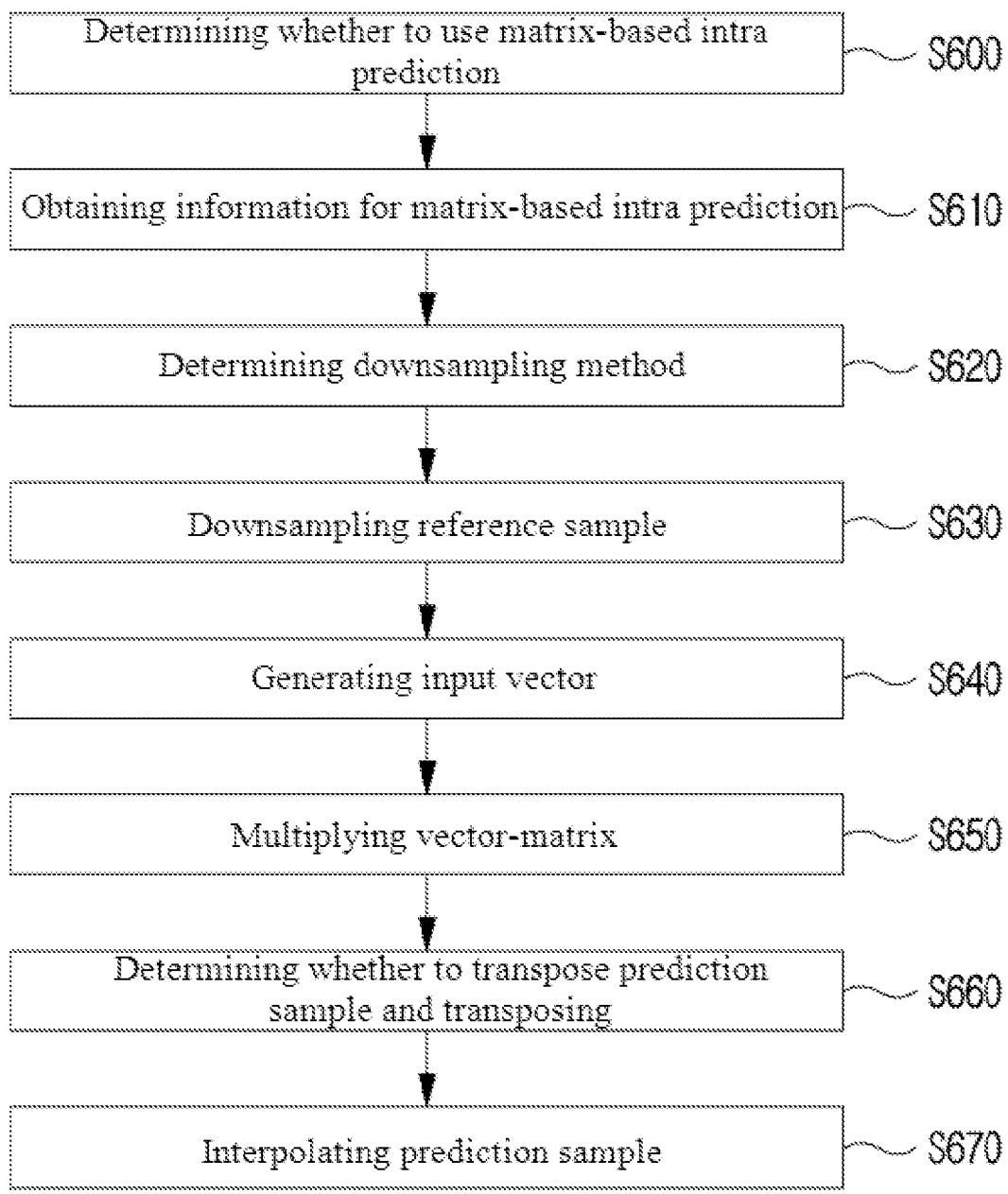
FIG. 6 is a diagram illustrating a step-by-step flow of matrix-based intra prediction to help understand the overall flow of matrix-based intra prediction in the present disclosure.

FIG. 6 is a diagram illustrating a step-by-step flow of matrix-based intra prediction to help understand the overall flow of matrix-based intra prediction in the present disclosure.

The matrix-based intra prediction may comprise determining whether to use matrix-based intra prediction (S600), obtaining information for matrix-based intra prediction (S610), determining a downsampling method (S620), downsampling a reference sample (S630), generating an input vector (S640), multiplying a vector-matrix (S650), determining whether to transpose a prediction sample and transposing (S660), and interpolating a prediction sample (S670). The above-described steps are only an example of the overall flow, and some steps may be omitted or selectively performed.

The step of determining whether to perform matrix-based intra prediction (S600) is a step of determining whether to perform matrix-based intra prediction with respect to a current block.

As an embodiment, whether to perform matrix-based intra-picture prediction may be determined by a flag received from one unit among a Sequence Parameter Set (SPS), a Picture Parameter Set (PPS), a Slice Header (SH), a Picture Header (PH), a Coding Tree Unit (CTU), or a Coding Unit (CU), PU (Prediction Unit). If a value of the flag is 0, other intra prediction methods may be performed instead of matrix-based intra prediction. On the contrary, if the value of the flag is If 1, a prediction block may be generated by performing matrix-based intra prediction.

As another embodiment, whether to perform matrix-based intra-picture prediction may be determined based on a horizontal length and a vertical length of the block. Whether to use matrix-based intra prediction may be determined according to whether the size of the block is greater than a predetermined threshold. Here, the size of the block may mean one of a horizontal length or a vertical length of the block, or may mean the sum or product of the horizontal length and the vertical length. For example, if the sum of the horizontal and vertical lengths of a block is greater than 64, matrix-based intra prediction is not performed. On the contrary, if the sum of the horizontal and vertical lengths of the current block is less than or equal to 64, matrix-based intra prediction may be performed. Here, 64 is only an example of the threshold, and the threshold may be 16, 32, or more.

Alternatively, if one of the horizontal length or the vertical length of the block is greater than 32, matrix-based intra prediction may not be performed. Otherwise, matrix-based intra prediction may be performed. Here, 32 is an example of the threshold, and the threshold may be 8, 16, or more.

If it is determined to use matrix-based intra prediction in the step of the matrix-based intra prediction determination (S600), the step of obtaining information for matrix-based intra prediction (S610) may be performed.

Information such as intra_mip_transposed and intra_mip_mode used for matrix-based intra prediction may be obtained from the entropy decoder. In addition, based on the block shape, a matrix value to be used in the step of the subsequent vector-matrix multiplication (S650) may be obtained/determined in advance.

Also, in this case, the obtained information may include information on a length of an input vector to be used in the step of vector-matrix multiplication (S650) and information on the number of output samples in the step of the vector-matrix multiplication.

The step of downsampling method determination (S620) may be performed based on information obtained from the step of obtaining information (S610) for matrix-based intra prediction.

In the step of downsampling method determination (S620), a position and/or the number of reference samples (or reference regions) used for downsampling, a position/number/length of reference lines to which a reference sample belongs, and length/filter coefficient/strength/type of a filter to be used for downsampling, a downsampling ratio, and the like may be determined.

In the step of downsampling the reference sample (S630), the reference sample determined in the step of downsampling method determination (S620) is downsampled through the downsampling filter, and a result value may be input to the step of input vector generation step (S640).

In the step of input vector generation (S640), an input vector may be generated using the downsampled reference sample received from the step of downsampling reference sample (S630) and input to the vector-matrix multiplication step.

The step of vector-matrix multiplication (S650) may generate a prediction sample using the matrix value and the input vector received from the step of obtaining information for matrix-based intra prediction (S610) and the step of input vector generation (S640), and may input the prediction sample to the step of determining whether to transpose the prediction sample and transposing (S660).

In the step of determining whether to transpose the prediction sample (S660), if it is determined whether to transpose the sampled prediction sample received from the step of vector-matrix multiplication and to perform transposition, the sampled prediction sample may be transposed and input to the step of the prediction sample interpolation (S670), on the contrary, if it is determined not to perform the transposition, the sampled prediction sample is directly input to the step of the prediction sample interpolation (S670).

In the step of the prediction sample interpolation (S670), a matrix-based intra prediction block may be generated by performing prediction sample interpolation using at least one of the received transposed prediction sample, the sampled prediction sample, the neighboring sample of the current block, or the input vector. In this case, after horizontal interpolation is performed, vertical interpolation may be performed, or only one of two interpolation may be performed.

Figure 7:
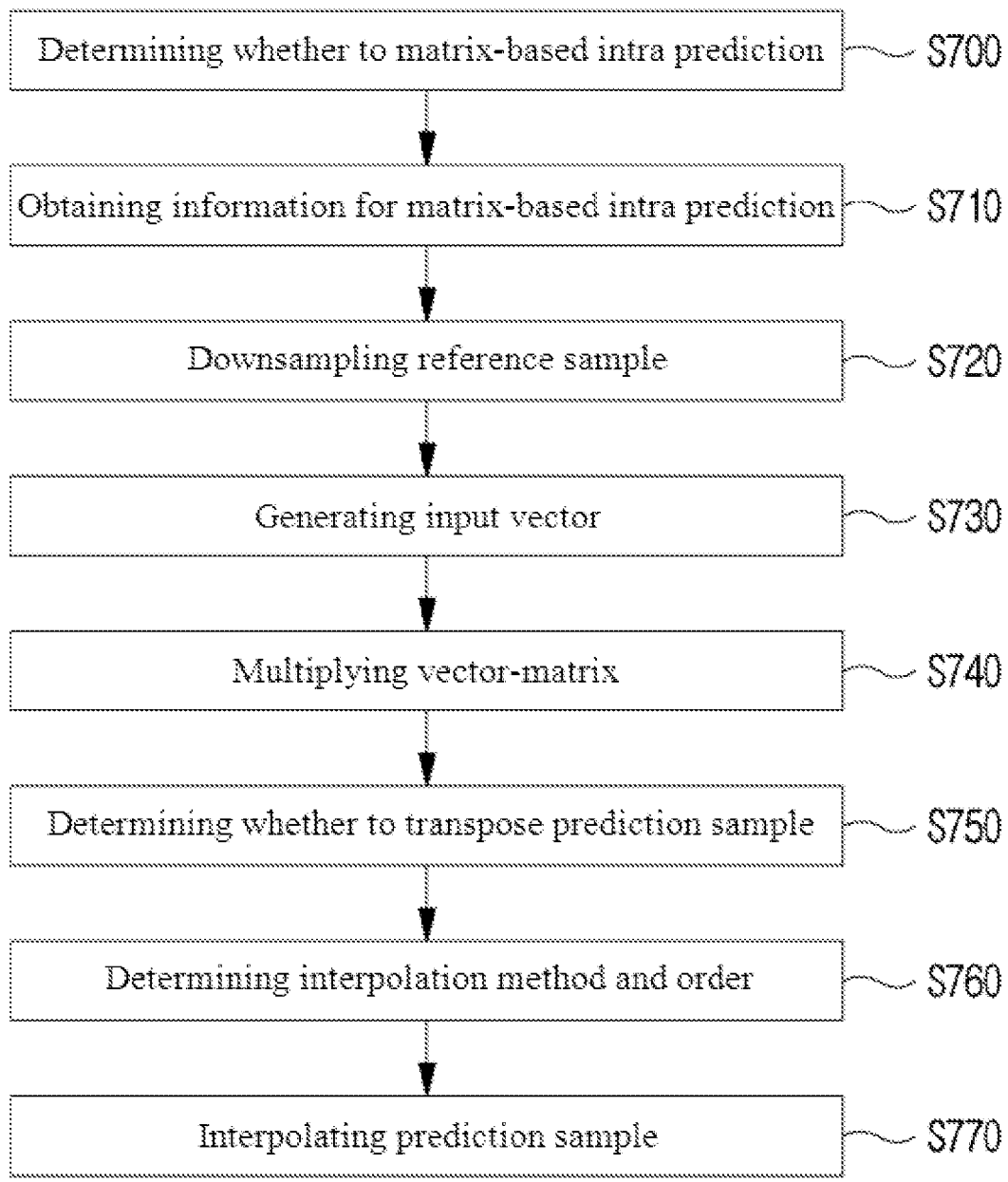
FIG. 7 is a diagram illustrating a step-by-step flow as another embodiment of matrix-based intra prediction to help understand the overall flow of matrix-based intra prediction according to the present disclosure.

FIG. 7 is a diagram illustrating a step-by-step flow as another embodiment of matrix-based intra prediction to help understand the overall flow of matrix-based intra prediction according to the present disclosure.

The matrix-based intra prediction may include determining whether to use matrix-based intra prediction (S700), obtaining information for matrix-based intra prediction (S710), downsampling reference sample (S720), generating input vector (S730), multiplying vector-matrix (S740), determining whether to transpose prediction sample and transposing (S750), determining interpolation method and order (S760), and interpolating prediction sample (S770). The above-described steps are only an example of the overall flow, and some steps may be omitted or selectively performed.

The step of determination whether to use matrix-based intra prediction (S700) is a step of determining whether to perform matrix-based intra prediction with respect to a current block.

If it is determined to use matrix-based intra prediction in the step of determination whether to use matrix-based intra prediction (S700), the step of obtaining information for matrix-based intra prediction (S710) may be performed.

In the step of downsampling reference sample (S720), a reference sample may be downsampled through the reference samples and the downsampling filter based on the information obtained from the step of obtaining information for matrix-based intra prediction (S710), and the result value may be input to the step of input vector generation (S730).

The step of input vector generation (S730) may generate an input vector using the downsampled reference sample input from the step of downsampling reference sample (S720), and may input it to the step of vector-matrix multiplication (S740).

The step of vector-matrix multiplication (S740) may generate a prediction sample sampled through the matrix value and the input vector input from the step of obtaining information for matrix-based intra prediction (S710) and the step of input vector generation (S730) and may input the prediction sample to the step of determining whether to transpose prediction sample and transposing (S750).

The step of determining whether to transpose prediction sample and transposing (S750) may determine whether to transpose the sampled prediction sample input from the vector-matrix multiplication step and, if it is determined to perform transposition, may transpose the sampled prediction sample and input it to the step of determining interpolation method and order (S760), and if it is determined not to perform the transposition, the sampled prediction sample may be directly input to the step of determining interpolation method and order (S760).

The step of determining interpolation method and order (S760) may determine the order for the interpolation direction based on the size, position, shape, etc. of the block, and may determine the filter shape, filter length, filter coefficient, etc. to be used for interpolation of the predicted sample, so that may input the corresponding information to the step of interpolating prediction sample (S770).

In the step of interpolating prediction sample (S770), a matrix-based intra prediction block may be generated by performing prediction sample interpolation using an input transposed prediction sample, a sampled prediction sample, a neighboring sample of the current block, and an input vector. In this case, interpolation may be performed according to a filter to be used for interpolation and an interpolation order determined in the step of determining interpolation method and order (S760).

Figure 8:
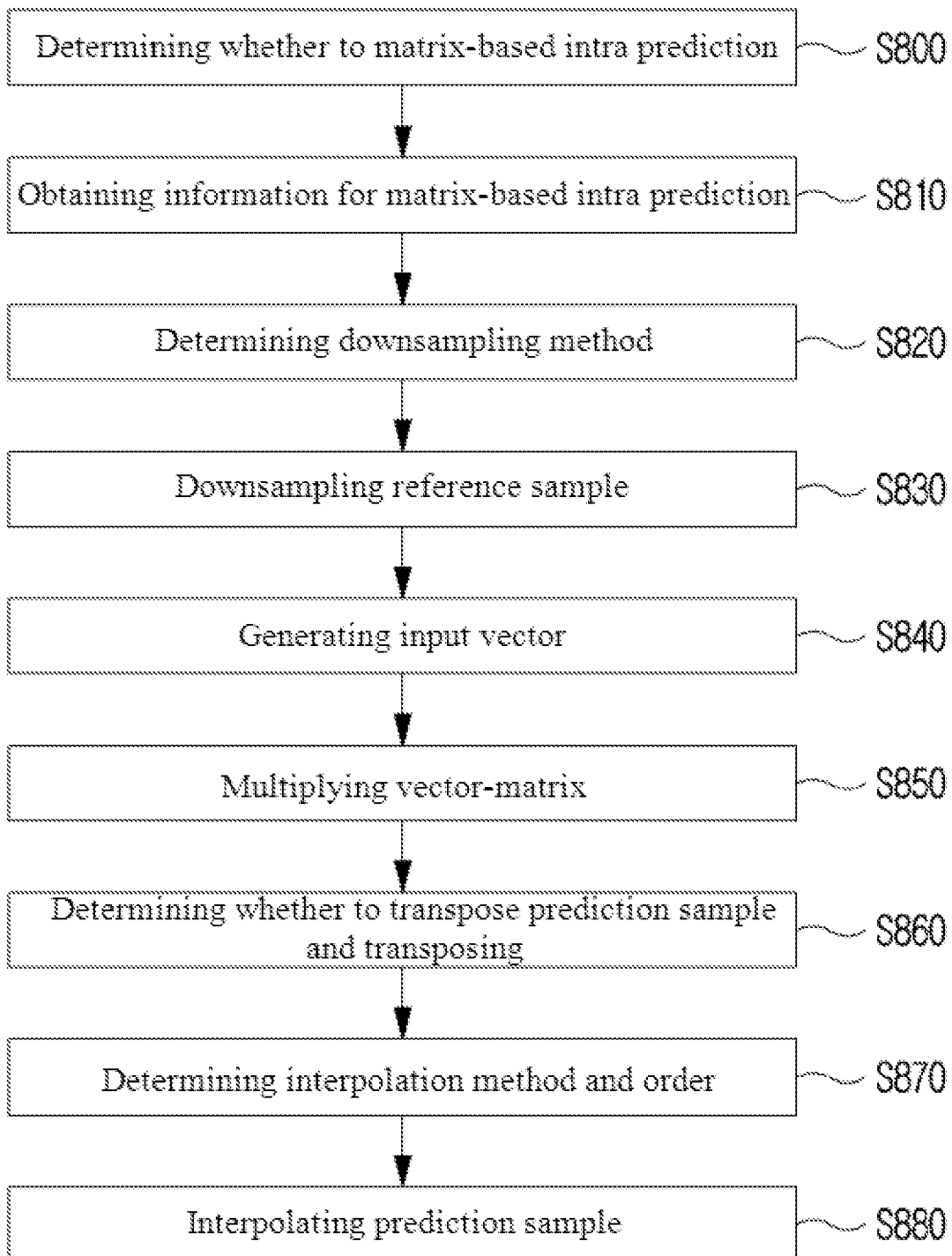
FIG. 8 is a diagram illustrating a step-by-step flow as another embodiment of matrix-based intra prediction to help understand the overall flow of matrix-based intra prediction according to the present disclosure.

FIG. 8 is a diagram illustrating a step-by-step flow as another embodiment of matrix-based intra prediction to help understand the overall flow of matrix-based intra prediction according to the present disclosure.

The matrix-based intra prediction may include determining whether to use matrix-based intra prediction (S800), obtaining information for matrix-based intra prediction (S810), determining downsampling method (S820), downsampling reference sample (S830), generating input vector (S840), multiplying vector-matrix (S850), determining whether to transpose prediction sample and transposing (S860), determining interpolation method and order (S870), interpolating prediction sample (S880). The above-described steps are only an example of the overall flow, and some steps may be omitted or selectively performed.

The step of determining whether to use matrix-based intra prediction (S800) is a step of determining whether to perform matrix-based intra prediction with respect to a current block.

If it is determined to use matrix-based intra prediction, the step of obtaining information for matrix-based intra prediction (S810) may be performed in the step of determining whether to use matrix-based intra prediction (S800).

In the step of determining downsampling method (S820), a reference sample used for downsampling, a length of a filter used for downsampling, filter coefficients, and the like may be determined.

In the step of downsampling reference sample (S830), based on information obtained from the step of determining downsampling method (S820) and the step of obtaining information for matrix-based intra prediction (S810), the reference sample is downsampled through the reference sample and a downsampling filter, and the result value may be input to the step of generating input vector (S840).

The step of generating input vector (S840) may generate an input vector using the downsampled reference samples input from the step of downsampling reference sample (S830), and may input it to the step of multiplying vector-matrix (S850).

The step of multiplying vector-matrix (S850) may generate a prediction sample sampled through a matrix value and input vector input from the step of obtaining information for matrix-based intra prediction (S810) and the step of generating input vector (S840). It may be input to the step of determining whether to transpose prediction sample and transposing (S860).

The step of determining whether to transpose prediction sample and transposing (S860) may determine whether to transpose the sampled prediction sample input from the vector-matrix multiplication step and, if it is determined to perform transposition, may transpose the sampled prediction sample and may input it to the step of determining interpolation method and order (S870), on the contrary, if it is determined not to perform the transposition, the sampled prediction sample may be directly input to the step of determining interpolation method and order step (S870).

The step of determining interpolation method and order (S870) may determine an order of the interpolation direction based on the size, position, shape, etc. of the block, and may determines the filter shape, filter length, filter coefficient, etc. to be used for interpolation of the prediction sample, and the corresponding information may be input to the step of interpolating prediction sample (S880).

In the step of interpolating prediction sample (S880), a matrix-based intra prediction block may be generated by performing prediction sample interpolation using at least one of the received interpolating prediction sample, the sampled prediction sample, the sample surrounding the current block, or the input vector. In this case, interpolation may be performed according to the filter to be used for the interpolation and the interpolation order determined in the step of determining interpolation method and order (S870).

The present disclosure relates to geometric block partitioning and prediction and compensation using the geometric block partitioning and among video coding techniques, here, the present disclosure relates to a video coding method and apparatus of dividing one square or rectangular block into a plurality of prediction units, and performing prediction and compensation in the divided prediction units.

Through geometric block partitioning, one square or rectangular block may be divided into two, three or more partitions. For this, one or more lines crossing a block may be used.

The prediction and compensation techniques using geometric block partitioning of the present disclosure includes technique for partitioning according to a pre-defined block partitioning shape, technique for a prediction and compensation method for each partitioning, and a technique for restricting or adding a direction of prediction and compensation.

Figure 9:
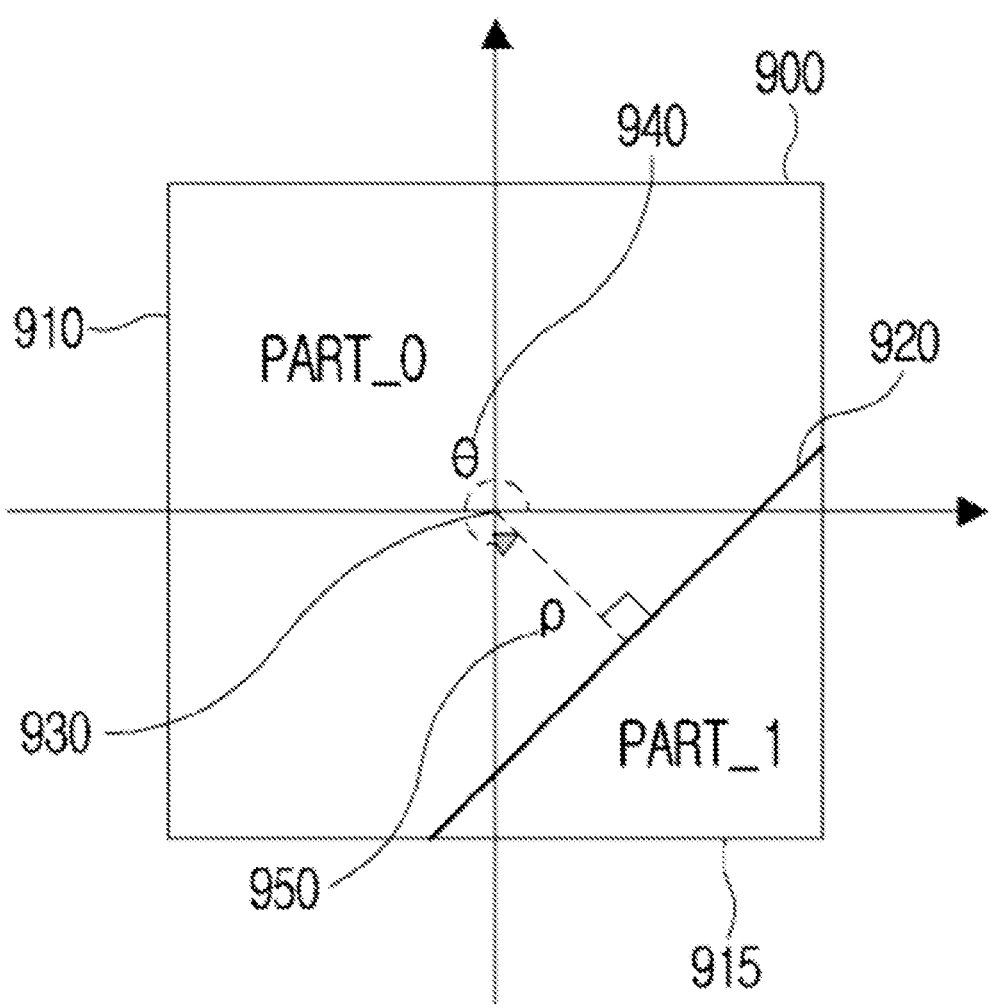
FIG. 9 illustrates an example of a block partitioning structure in which a block is partitioned into two in an arbitrary shape (geometric block shape) using one line in the present disclosure.

FIG. 9 illustrates an example of a block partitioning structure in which a block is partitioned into two in an arbitrary shape (geometric block shape) using one line in the present disclosure.

In FIG. 9, the block partitioning structure in which a block is partitioned into two in an arbitrary shape using one line includes using one line (920) to partition a current block 910 into two different regions, PART_0 910 and PART_1 915. With respect to the line 920 partitioning the current block 910 into two, a type of block partitioning may be determined according to a length 950 and an angle 940 of the line orthogonal to the line 920 with the center of the current block 910 as the origin.

In this case, a pre-defined number of types such as 32, 64, or 128 may be used as the type of partitioning, and the number may be signaled through a high-level syntax. At least one of the angle or the length 950 of the orthogonal line 920 for dividing the geometric block partitioning may be encoded and signaled by an encoding apparatus. The length of the orthogonal line may specify a direction and/or a position in which the corresponding line 920 is shifted with respect to the origin.

The length 950 and the angle 940 for expressing the line 920 partitioning the current block 900 into two according to an embodiment may have a range of values dependent on properties of the current block 900. In this case, the type of the partitioning may be altered according to the properties of the current block 900. Here, the properties may mean the size, shape, width and height ratio of the block, component type, and the like.

For example, if the size of the current block belongs to a first threshold range, all partitions pre-defined in the encoding/decoding device are allowed, otherwise, some partitions (e.g., diagonal division) may be selectively allowed. Alternatively, the type of partitioning available when the current block is square may be different from the type of partitioning available when the current block is non-square. Alternatively, the types of available partitioning may be the same regardless of the shape of the current block, but if a ratio of width to height is greater than a predetermined threshold ratio, geometric block division may not be allowed, or may be limited to use only some of types of partitioning pre-defined in the encoding/decoding device.

Figure 10:
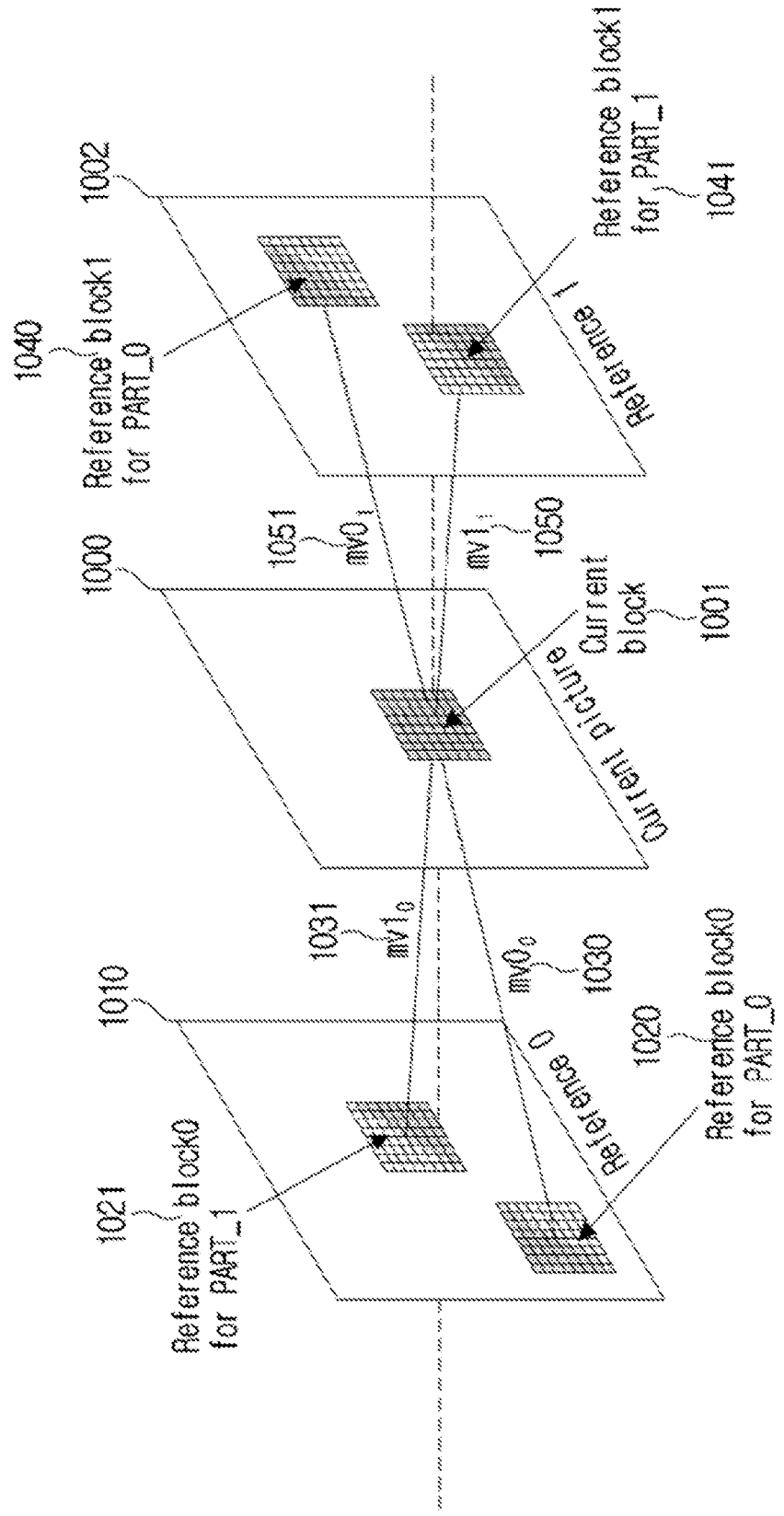
FIG. 10 is a diagram illustrating a concept of motion prediction and motion compensation for a block partitioned using geometric block partitioning proposed in the present disclosure.

FIG. 10 is a diagram illustrating a concept of motion prediction and motion compensation for a block partitioned using geometric block partitioning proposed in the present disclosure.

Motion prediction and motion compensation of a partitioned block using geometric block partitioning proposed in the present disclosure is a method of performing motion prediction and motion compensation by applying a mask to reference blocks at two or more different positions with respect to one block.

In FIG. 10, with respect to the current block 1001 in a picture 1000 to be currently encoded and decoded, a method of obtaining a pixel obtained from the reference block $P_{P0}$ 1020 referenced by using a motion vector 1030 for some pixels of the current block, and obtaining a pixel from the reference block $P_{P1}$ 1021 referenced by using a motion vector 1031 for other pixels of the current block is illustrated.

In this case, in the process of obtaining some pixels of the current block, a method of referencing target pixels in the form of multiplying a pixel value at the same position in the reference block by a weight may be used.

In prediction using geometric block partitioning proposed in the present disclosure, prediction and compensation pixels may be obtained using different weights according to the positions of the target pixels as in the embodiment, and this is defined as mask-based motion prediction and motion compensation.

The prediction block ($P_{CUR}$) of the current block obtained through the mask-based motion prediction and motion compensation may be obtained as in Equation 3.

In this case, $P_{P0}$ and $P_{P1}$ mean prediction blocks predicted with different motions, and $MASK_{P0}(x,y)$ and $MASK_{P1}(x,y)$ represent x, y weights in x, y coordinates, and the sum of $MASK_{P0}(x,y)$ and $MASK_{P1}(x,y)$ should be equal to $2^{shift}$.

$$P_{CUR}(x,y)=(P_{P0}(x,y) \times MASK_{P0}(x,y)+P_{P1}(x,y) \times MASK_{P1}(x,y)+\text{offset})>>\text{shift} \quad \text{[Equation 3]}$$

In this case, the offset of Equation 3 may be 0 according to an embodiment. According to another embodiment, it may be $2^{(shift-1)}$.

As shown in FIG. 10, in performing mask-based motion prediction and motion compensation for the current block 1001, not only uni-directional prediction but also bi-directional prediction may be used.

However, a direction of prediction of one or more prediction partitions (the PART_0, PART_1, etc.) included in one coding block may be limited or added only in some cases described later in the present disclosure. It may be restricted so that only uni-directional prediction is allowed for all prediction partitions configuring the one coding block. Alternatively, it may be restricted that only unidirectional prediction is allowed for some of the plurality of prediction partitions, and bi-directional prediction may be allowed for others. Here, some prediction blocks restricted to unidirectional prediction may be specified in consideration of a type of geometric block partitioning, a block position according to the geometric block partitioning, and the like.

Figure 11:
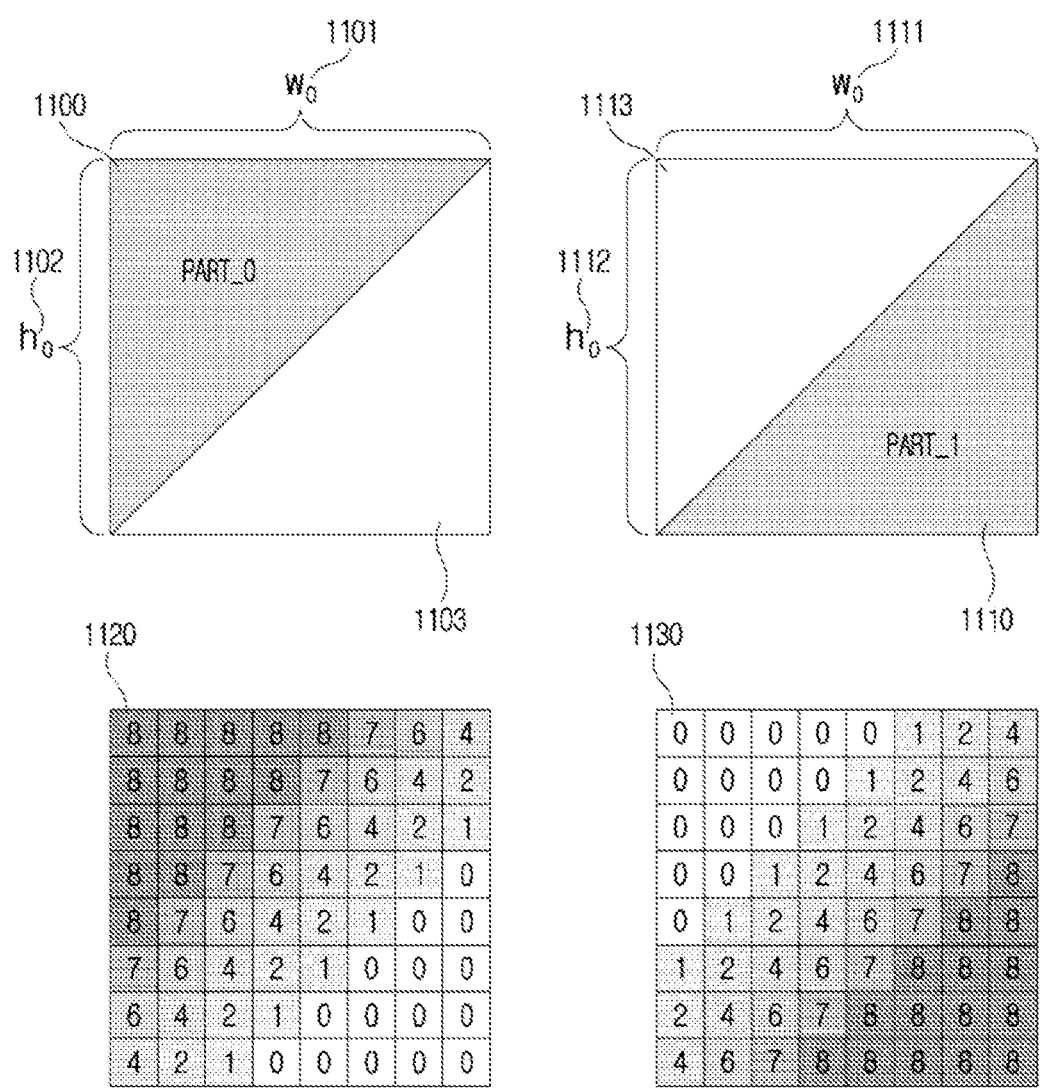
FIG. 11 is a diagram illustrating an embodiment in which a block is partitioned into two using two diagonal lines among geometric block partitioning proposed in the present disclosure.

FIG. 11 is a diagram illustrating an embodiment in which a block is partitioned into two using two diagonal lines among geometric block partitioning proposed in the present disclosure.

FIG. 11 shows an embodiment in which a block is partitioned into two using one line connecting a top-right corner and a bottom-left corner, in this case, the top prediction block in which one block is partitioned into two may be referred to PART_0 (1100), the bottom prediction block may be referred to PART_1 (1110).

In addition, in this case, for a pixel unit expression for PART_0 (1100), when expressed as an 8×8 block using an embodiment of different weights according to pixel positions in the present disclosure, it is the same as block 1120, and when expressed for PART_1 (1110), it is the same as block 1130.

In this case, in order to obtain prediction pixels corresponding to PART_0 (1100) which is the top prediction block, pixels corresponding to a block having a width w0 and a height h0 are required as shown in block 1120.

Accordingly, a size of an actual required prediction block for prediction and compensation of PART_0 (1100) requires as many pixels as w0×h0 which is the size of the current coding block.

Similarly, in order to obtain prediction pixels corresponding to PART_1 (1110) which is the bottom prediction block, pixels corresponding to a block having a width w0 and a height h0 are required as shown in block 1130.

Therefore, in the case of partitioning one coding block into two different geometric block partitions, assuming that both partitions perform bi-directional prediction in obtaining and compensating prediction blocks for PART_0 and PART_L it is necessary to obtain prediction blocks of up to w0×h0×4.

This means that a prediction block having a size twice as large as w0×h0×2, which is a size of a prediction block required for bi-directional prediction of a general coding block, is required.

Accordingly, in this case, the direction of motion prediction for each partition may be restricted to uni-direction so that the size of a block required to obtain a prediction block relative to one coding block may be limited to w0×h0×2.

Figure 12:
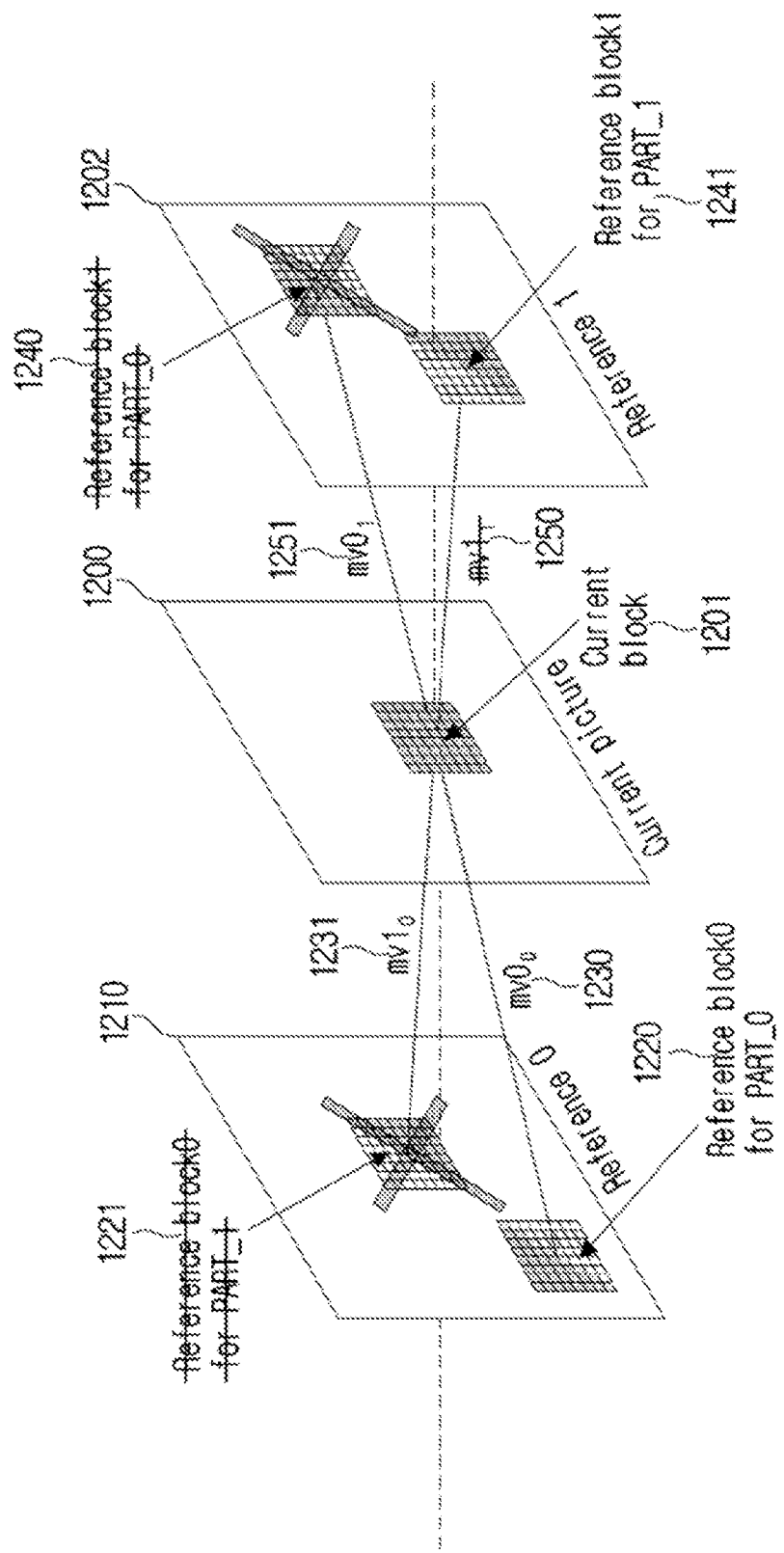
FIG. 12 shows a method of restricting a prediction direction according to a pre-defined condition to reduce in order to reduce a memory bandwidth in performing mask-based motion prediction and motion compensation.

FIG. 12 shows a method of restricting a prediction direction according to a pre-defined condition to reduce in order to reduce a memory bandwidth in performing mask-based motion prediction and motion compensation shown in FIG. 10 for a current block 1201 in a picture 1200 that is currently encoded and decoded.

However, according to an embodiment of the present disclosure, adding a prediction direction according to a pre-defined condition may also be included.

In this case, the pre-defined condition may be an inter prediction mode, that is, mode information for performing inter prediction such as SKIP, MERGE, AMVP, and intra block copy (IBC). For example, prediction and compensation using geometric block partitioning may be performed only for some inter prediction modes (e.g., MERGE mode) among inter prediction modes pre-defined in the encoding/decoding apparatus. However, the present disclosure is not limited thereto, and prediction and compensation using geometric block partitioning may also be allowed for the AMVP mode or the IBC mode.

Alternatively, some partitions of the current block may be encoded/decoded in an inter prediction mode and the remaining partitions are encoded/decoded in an intra prediction mode, respectively. In this case, bi-directional prediction may be allowed regardless of a type of the inter prediction mode.

In addition, the specific condition may refer to a case in which the size of the block, i.e., the width or height of the block is less than or equal to a predetermined size, and in this case, the predetermined size may be 8. Also, it may be 16, 32, 64, etc. having an exponential value of 2.

In addition, the specific condition may mean the size of a coding block including a plurality of prediction blocks generated through geometric partitioning, but may mean the size of two prediction blocks in which one coding block is partitioned through geometric block partitioning.

That is, when one coding block is partitioned into two through geometric block partitioning and partitioned into two prediction blocks, the prediction direction may be restricted or may be added according to at least one of a width or height of each prediction block.

A prediction direction may be restricted or may be added by using the width and height of each prediction block as a pre-defined condition.

In this case, in using the width and height information as a condition, a value obtained through an operation such as the sum or product of each width and height may be used as a condition for comparison with a specific pre-defined value.

In this case, the specific pre-defined value may be defined as an integer value equal to or smaller than the width or height value of the coding block from 1. Alternatively, the specific pre-defined value may be defined as an arbitrary integer within the range of 1 to less than or equal to the sum or product of the width and height of the coding block. Alternatively, the specific pre-defined value may be defined as an arbitrary integer within the range of 1 to less than or equal to the width or height of the prediction block. Alternatively, the specific pre-defined value may be defined as an arbitrary integer within the range of 1 to less than or equal to the sum or product of the width and height of the prediction block.

In one embodiment, the pre-defined value for one prediction block of geometric block partitioning partitioned in a 32×32 coding block may be a specific integer within 1 to 32, or one or more values of 4, 6, 8, 10, 12, 14, 16, 18, 20, 22, 24, and the like.

Alternatively, in using the width and height of each prediction block as a condition, a relative size comparison of size information of two different partition prediction blocks may be used as a condition.

In this case, in performing the relative size comparison of the size information of the two different partition prediction blocks, the size of each partition prediction block may be a value obtained through respective values of width and height or an operation such as sum or product of width and height.

Figure 13:
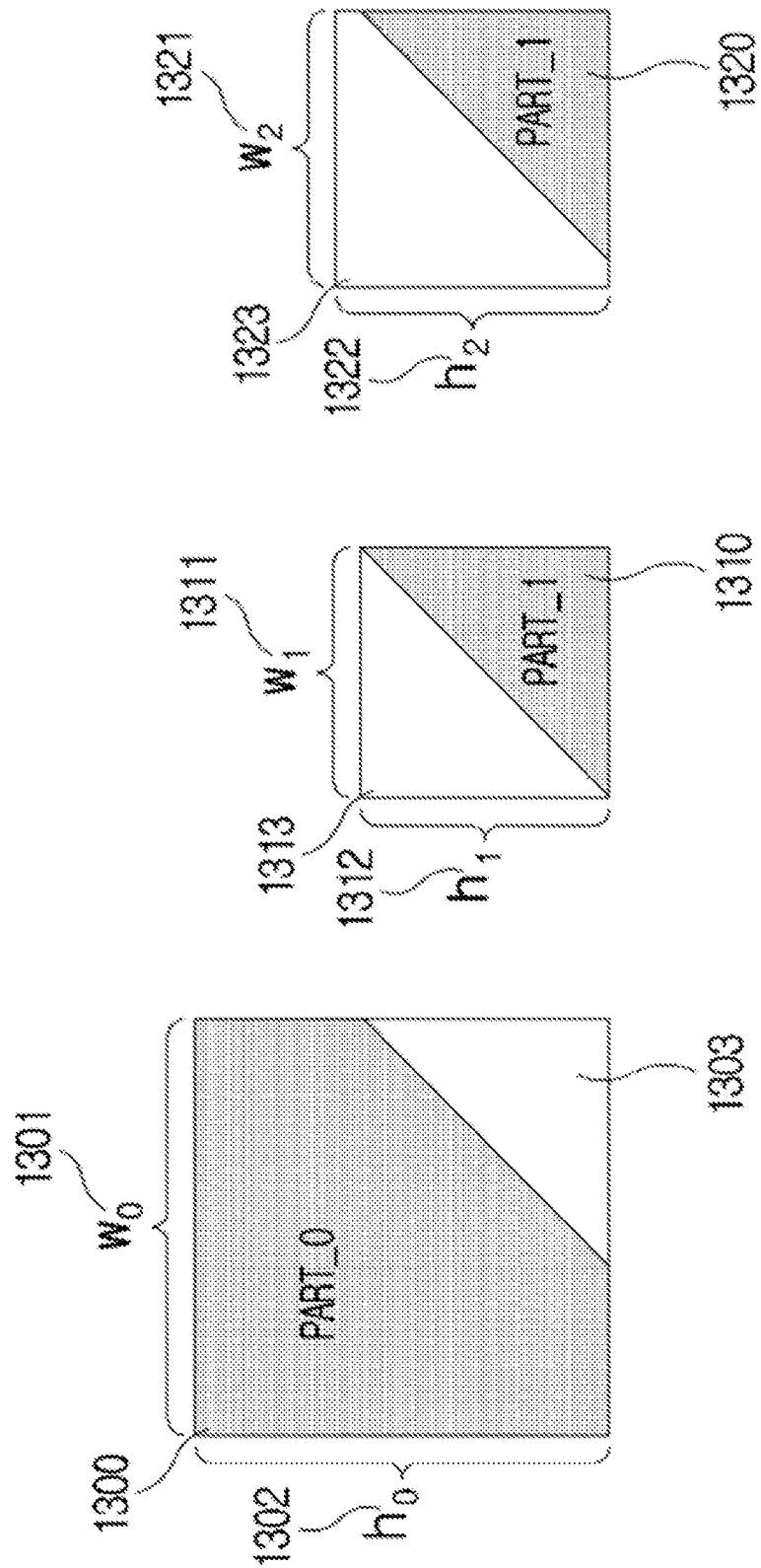
FIG. 13 is a diagram illustrating a concept and size of a memory patch required for block partitioning with respect to geometric block partitioning proposed in the present disclosure.

FIG. 13 is a diagram illustrating a concept and size of a memory patch required for block partitioning shown in FIG. 9 among an embodiment of geometric block partitioning proposed in the present disclosure.

In this case, the memory patch required for each partitioning refers to the concept of a memory space required to store a pixel, prediction pixel, transform coefficient, quantization coefficients, etc. of the partitioning required for block unit processing such as motion prediction and motion compensation, intra prediction and compensation, transform, quantization, etc.

In this case, the memory patch may have a width w (1301, 1311) and a height h (1302, 1312) that may be required for processing of each partitioning. In this case, among geometric block partitions, PART_0 requires memory patches having the width of w0 and the height of h0. Also, among geometric block partitions, PART_1 requires memory patches having the width of w1 and the height of h1.

In this case, in actual hardware and software implementation, the memory patch includes a memory in the form of a primary array as much as the product of a width and a height, and includes a memory in the form of a secondary array.

As in the embodiment shown in FIG. 13, the size of the memory patch used for prediction of the PART_0 prediction block needs to be w0×h0, and the size of the memory patch used for prediction of the PART_1 prediction block needs to be w1×h1.

However, in calculating the size of the memory patch, pixels having a specific width and height may be added to calculate the mutually weighted sum of PART_0 and PART_1.

As in block 1320 of FIG. 13, a memory as much as one or more integer pixels than the width 1311 of w1 and the height 1312 of h1 by the width 1321 of w2 and the height 1322 of h2 may be added.

In this case, according to the present embodiment, the size of the memory patch used for prediction of the PART_1 prediction block needs to be w2×h2. This may be equally applied to the PART_0 prediction block.

Therefore, in the present disclosure, only when the sum of w0×h0, which is the size of the memory patch required for PART_0, and w1×h1, which is the size of the memory patch required for PART_1, is smaller than 2×w×h required for bi-directional prediction of the current coding block, bi-directional prediction may be performed on one or more prediction block among PART_0 and PART_1. In this case, w and h denote the width and height of the current coding block.

Figure 14:
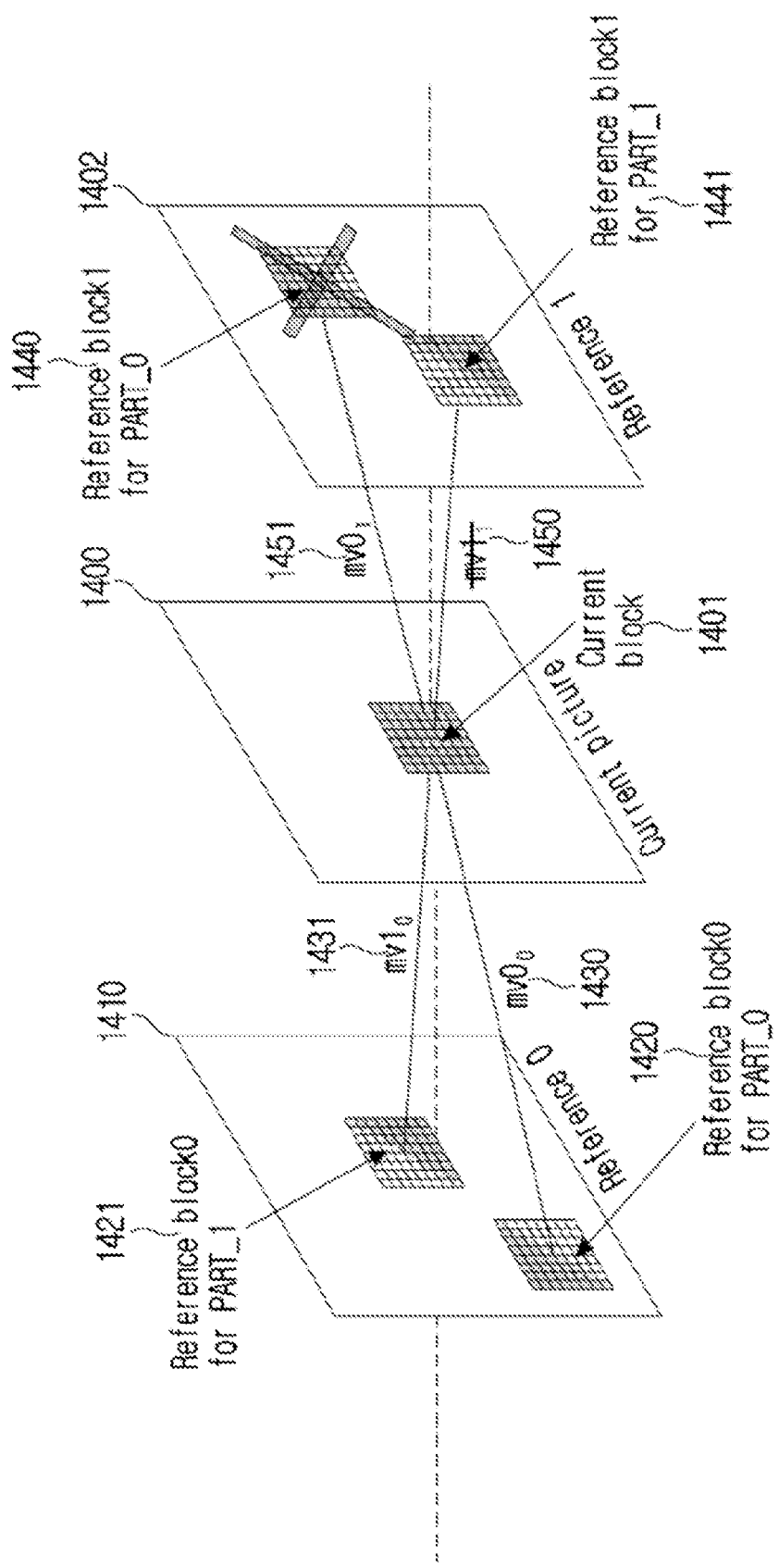
FIG. 14 shows a method of restricting a prediction direction according to a specific condition to reduce a memory bandwidth, in performing mask-based motion prediction and motion compensation.

FIG. 14 shows a method of restricting a prediction direction according to a specific condition to reduce a memory bandwidth with respect to a current block 1401 in a picture 1400 that is currently encoded and decoded, in performing mask-based motion prediction and motion compensation shown in FIG. 10.

As shown in FIGS. 11, 12, and 13, when a pre-defined condition is satisfied in predicting and compensating for geometric block partitioning, for the prediction direction restricted as in the embodiment shown in FIG. 12, a prediction direction may be added to at least one or more prediction blocks among two geometric block partitions as shown in the embodiment shown in FIG. 14.

In this case, the pre-defined condition may mean an absolute or relative size of size information of each geometric block partitioning, as described in the detailed description of FIGS. 12 and 13, or may mean the width and height of the current coding block, or may mean comparison of a size using the width and height of each geometric block partition.

As an embodiment of the pre-defined condition, when the width and height of the current coding block are w and h, and the width and height of the first geometric block partition are w0, h0, and the width and height of the second geometric block partition are w1, h1, the pre-defined condition may be a case where w0×h0+(2×w1×h1)<=2×w×h is satisfied, or (2×w0×h0)+w1×h1<=2×w×h is satisfied.

In this case, the w0, h0, w1, and h1 may be the width and height of each geometric block partition, as described in the embodiment of block 1320 of FIG. 13, and may be a size including the width and height added for weighted sum.

When the condition is satisfied, bi-directional prediction may be performed on at least one of the first geometric block partition and the second geometric block partition.

In this case, the target block for which the bi-directional prediction is performed may correspond to a smaller block among the first geometric block partition and the second geometric block partition.

Alternatively, a shape of a geometric block partitioning that satisfies the condition may be defined in advance, and bi-directional prediction may be performed on at least one block without performing the condition check on the defined partition. Shapes of geometric block partitioning pre-defined in the encoding/decoding apparatus may be classified into a plurality of groups. For example, a first group may be a partition group in which bi-directional prediction is allowed for all of a plurality of partitions belonging to the current block. A second group may be a partition group in which bi-directional prediction is allowed for some of the plurality of partitions belonging to the current block and only uni-directional prediction is allowed for others. A third group may be a partition group in which only uni-directional prediction is allowed for all of the plurality of partitions belonging to the current block. The encoding/decoding apparatus may define only the first and second groups described above, only the second and third groups, or define only the first and third groups. Alternatively, the encoding/decoding apparatus may define only one of the above-described first to third groups, or may define all of the first to third groups.

Figure 15:
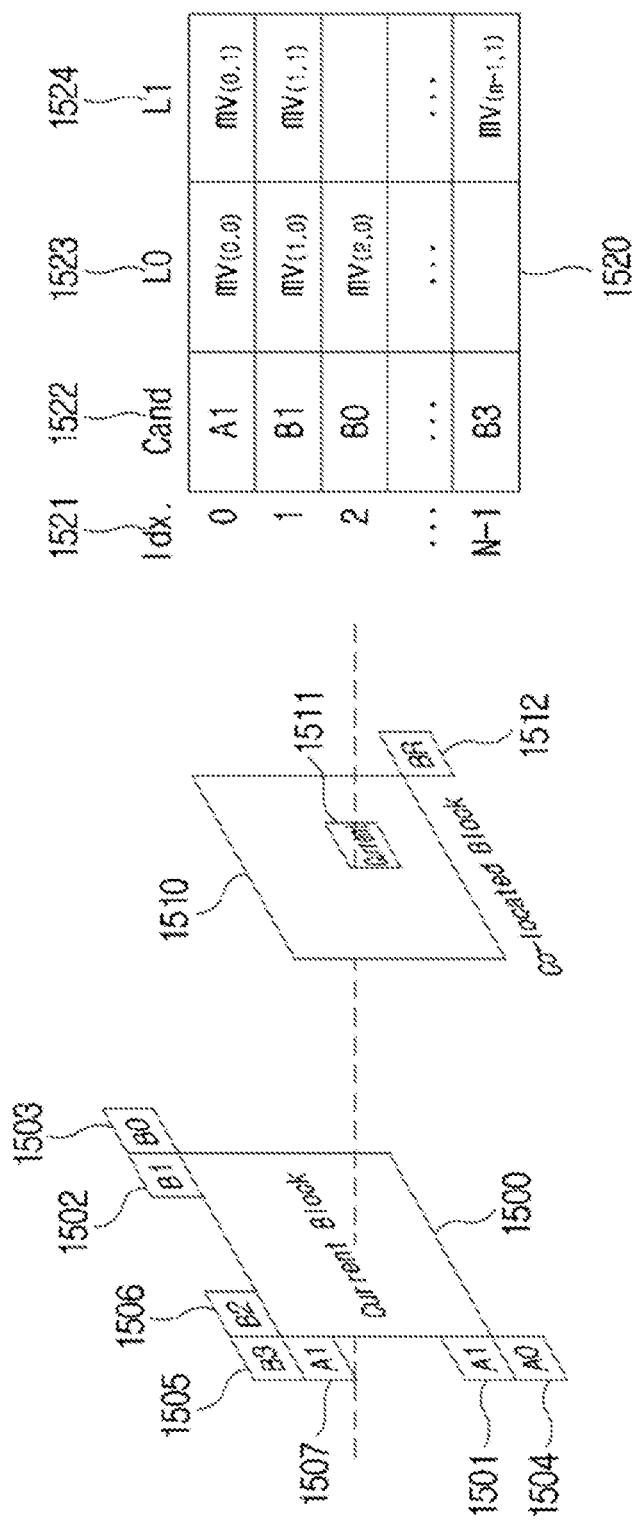
FIG. 15 shows neighboring motion information referenced in performing geometric block partitioning proposed in the present disclosure and a reference motion information list generated using the motion information.

FIG. 15 shows neighboring motion information referenced in performing geometric block partitioning proposed in the present disclosure and a reference motion information list generated using the motion information.

In this case, due to restriction of a prediction directionality of geometric block partitioning proposed in the present disclosure, when constructing the motion information list, a step of restricting the directionality of the reference motion information may be added. For example, only prediction information in the L0 direction (or L1 direction) may be added to a first candidate of the motion information list, and only prediction information in the L1 direction (or L0 direction) may be added to a second candidate. However, when the first candidate does not have the L0 direction prediction information, the L1 direction prediction information of the first candidate may be added to the L0. Similarly, when the second candidate does not have prediction information in the L1 direction, the prediction information in the L0 direction of the second candidate may be added to L1.

Alternatively, due to the addition of the prediction directionality of the geometric block partitioning proposed in the present disclosure, when constructing the motion information list, the step of adding the directionality to the reference motion information may be added. For example, a candidate of the motion information list may have only L0 prediction information. In this case, when constructing the motion information list, it is possible to copy the L0 prediction information and add it to L1. Alternatively, the L0 prediction information may be scaled by a predetermined scaling factor, and this may be added to L1. Here, the scaling factor may be determined based on at least one of the distance between the current picture and the L0 reference picture or the distance between the current picture and the L1 reference picture.

Alternatively, due to the restriction of the prediction directionality of the geometric block partitioning proposed in the present disclosure, the step of restricting the directionality may be added in the step of obtaining the reference motion information from the constructed motion information list.

When the index 1521 of the current prediction block is an odd number, only prediction information in the L0 direction is extracted and used. Otherwise, only prediction information in the L1 direction is extracted and used to force uni-directional prediction. Alternatively, when the index 1521 of the current prediction block is an odd number, only prediction information in the L1 direction is extracted and used. Otherwise, only prediction information in the L0 direction is extracted and used to force uni-directional prediction.

Alternatively, it may be forced to perform only prediction in a specific direction with respect to at least one prediction block belonging to one coding block. Here, the specific direction may mean any one of the L0 and L1 directions. That is, only the prediction information of the specific direction may be extracted from the candidate specified by the index of the prediction block, and uni-directional prediction may be performed using this. However, when the corresponding candidate does not have prediction information in the specific direction, the prediction information in the other direction may be copied and used.

Alternatively, prediction blocks belonging to one coding block may be forced to perform different uni-directional predictions. For example, when the first prediction block performs uni-directional prediction in the L0 direction, the second prediction block may be restricted to perform uni-directional prediction in the L1 direction.

Alternatively, a prediction block may perform uni-directional prediction depending on a prediction direction of a candidate. For example, when a candidate of the current prediction block has only prediction information in the L1 direction, the current prediction block may perform only L1 prediction. However, when the corresponding candidate is bi-directional prediction, prediction information of L0 or L1 prediction may be selectively used according to a predetermined priority. Here, the priority may be in a fixed order (e.g., L0→L1 or L1→L0) pre-promised to the encoding/decoding apparatus, or may be determined in consideration of a prediction direction of a neighboring prediction block. The neighboring prediction block may be a block belonging to the same coding block as the current prediction block, or may mean a block spatially/temporally adjacent to the current coding block.

Alternatively, due to the addition of the prediction directionality of the geometric block partitioning proposed in the present disclosure, the step of adding the directionality in the step of obtaining the reference motion information from the motion information list may be added. For example, it is assumed that bi-directional prediction is allowed for the current prediction block, but a candidate specified by an index of the current prediction block has only uni-directional prediction information. If the candidate of the current prediction block has only L0 prediction information, the L0 prediction information and the L1 prediction information of the current prediction block are respectively set based on the L0 prediction information of the candidate, and bi-directional prediction may be performed using them.

In addition, due to the addition of the prediction directionality of the geometric block partitioning proposed in the present disclosure, the step of selecting one of motion information of a first geometric block partition and motion information of a second geometric block partition or combining the motion information of the first geometric block partition and the motion information of the second geometric block partition may be added in the step of storing block unit motion information. For example, geometric block partition may have bi-directional motion information among the motion information of the first geometric block partition and the motion information of the second geometric block partition. In this case, it is possible to store motion information of block partition having bi-directional motion information among the motion information of the first geometric block partition and the motion information of the second geometric block partition.

Alternatively, when the motion information of the block partition having uni-directional motion information among the motion information of the first geometric block partition and the motion information of the second geometric block partition is L0 motion information, motion information corresponding to L1 in motion information of a block partition having bi-directional motion information among the motion information of the first geometric block partition and the motion information of the second geometric block partition may be combined into new bi-directional motion information with the L0 motion information and may be stored.

Alternatively, when the motion information of the block partition having uni-directional motion information among the motion information of the first geometric block partition and the motion information of the second geometric block partition is L1 motion information, motion information corresponding to L0 in motion information of a block partition having bi-directional motion information among the motion information of the first geometric block partition and the motion information of the second geometric block partition may be combined into new bi-directional motion information with the L1 motion information and may be stored.

A variety of embodiments of the present disclosure do not enumerate all possible combinations, but are to describe the representative aspect of the present disclosure, and matters described in various embodiments may be independently applied or may be applied by two or more combinations.

In addition, a variety of embodiments of the present disclosure may be implemented by a hardware, a firmware, a software, or their combination, etc. For implementation by a hardware, implementation may be performed by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), general processors, controllers, microcontrollers, microprocessors, etc.

A range of the present disclosure includes software or machine-executable instructions (e.g., an operating system, an application, a firmware, a program, etc.) which execute an action according to a method of various embodiments in a device or a computer and a non-transitory computer-readable medium that such software or instructions, etc. are stored and are executable in a device or a computer.

INDUSTRIAL AVAILABILITY

The present disclosure may be used for encoding/decoding a video.

The invention claimed is:

1. A method of decoding an image, the method comprising:
    obtaining information for matrix-based prediction of a current block; and
    generating a prediction block of the current block based on the information for the matrix-based prediction,
    wherein generating the prediction block comprises:
    determining a reference region for the matrix-based prediction;
    generating an input vector for the matrix-based prediction by applying a downsampling filter to the reference region;
    obtaining a first prediction sample of the current block based on the input vector and a matrix value for the matrix-based prediction; and
    obtaining a second prediction sample of the current block through interpolation based on at least one of the first prediction sample, a neighboring sample of the current block, or the input vector.

2. The method of claim 1, wherein the reference region is determined as at least one of a plurality of candidate lines pre-defined in an image decoding apparatus, and
    wherein the plurality of candidate lines includes at least one of a top sample line, a left sample line, a top-right sample line, or a bottom-left sample line of the current block.

3. The method of claim 2, wherein the reference region further includes a corner sample of the current block.

4. The method of claim 3, wherein a length of the input vector is variably determined based on a property of the current block, and
    wherein the property of the current block includes at least one of a size, a shape, a position, or a component type of the current block.

5. The method of claim 4, wherein a number of taps of the downsampling filter is variably determined based on a length of a reference sample line belonging to the reference region.

6. The method of claim 4, wherein the neighboring sample of the current block includes a first neighboring sample located on the same horizontal line as the second prediction sample and a second neighboring sample located on the same vertical line as the second prediction sample.

7. The method of claim 6, wherein a direction of the interpolation is variably determined based on the property of the current block.

* * * * *